US010679160B1

(12) United States Patent
Mcfeeters et al.

(10) Patent No.: US 10,679,160 B1
(45) Date of Patent: Jun. 9, 2020

(54) ENTERPRISE FULFILLMENT SYSTEM WITH DYNAMIC PREFETCHING CAPABILITIES, SECURED DATA ACCESS CAPABILITIES AND SYSTEM MONITORING

(71) Applicant: JPMorgan Chase Bank, N.A., New York, NY (US)

(72) Inventors: Travis Mcfeeters, Pickerington, IA (US); Cory R. Mathew, Delaware, OH (US); Stephen Piatt, Dublin, OH (US); Warren Lewis, Chandler, AZ (US)

(73) Assignee: JPMORGAN CHASE BANK, New York, NY (US)

( * ) Notice: Subject to any disclaimer, the term of this patent is extended or adjusted under 35 U.S.C. 154(b) by 757 days.

(21) Appl. No.: 14/542,058

(22) Filed: Nov. 14, 2014

Related U.S. Application Data

(63) Continuation-in-part of application No. 13/480,068, filed on May 24, 2012, now Pat. No. 9,697,524.
(Continued)

(51) Int. Cl.
*G06Q 10/06* (2012.01)
*H04L 29/06* (2006.01)

(52) U.S. Cl.
CPC ............ *G06Q 10/06315* (2013.01); *G06Q 10/063114* (2013.01); *G06Q 10/063118* (2013.01); *H04L 63/101* (2013.01)

(58) Field of Classification Search
None
See application file for complete search history.

(56) References Cited

U.S. PATENT DOCUMENTS 5,787,403 A  7/1998 Randle
5,825,003 A  10/1998 Jennings et al.
(Continued)

FOREIGN PATENT DOCUMENTS

WO  WO-2014159187 A2  * 10/2014

OTHER PUBLICATIONS

Ribiero-Neto, et al., Top-Down Extraction of Semi-Structured Data, 1999, IEEE 6th International Symposium on String Processing and Information Retrieval Symposium, pp. 176-183 (Year: 1999).*
(Continued)

*Primary Examiner* — Amanda Gurski
(74) *Attorney, Agent, or Firm* — Greenblum & Bernstein, P.L.C.

(57) ABSTRACT

Systems and methods for providing services to customers in response to customer requests received through one or more channels are disclosed. The present invention provides for a central fulfillment hub in which all requests from banking customers may be processed by applying a library of policies to systematically resolve the customer requests or engage resources necessary to resolve such requests. The disclosed fulfillment system, thus, may open a request, prefetch the necessary information, take steps to resolve the request, and close the request accordingly in a dynamic and efficient manner on a request-by-request basis. In addition, the system may provide security mechanisms to secure access to resources, including applications and data, based on applications, assigned user roles or user, activities, and access control configurations. Further, the system may dynamically allocate employees across teams based on system demand and provide secured access to the resources accordingly.

38 Claims, 26 Drawing Sheets

Related U.S. Application Data

(60) Provisional application No. 61/904,772, filed on Nov. 15, 2013.

(56) References Cited

U.S. PATENT DOCUMENTS

| | | | |
|---|---|---|---|
| 5,899,982 A | 5/1999 | Randle | |
| 5,903,881 A | 5/1999 | Schrader et al. | |
| 5,920,629 A | 7/1999 | Bosen | |
| 5,933,816 A | 8/1999 | Zeanah et al. | |
| 5,953,423 A | 9/1999 | Rosen | |
| 5,966,695 A | 10/1999 | Melchione et al. | |
| 6,029,147 A | 2/2000 | Horadan et al. | |
| 6,101,601 A | 8/2000 | Matthews et al. | |
| 6,115,690 A | 9/2000 | Wong | |
| 6,535,855 B1 | 3/2003 | Cahill et al. | |
| 6,910,020 B2 | 6/2005 | Oyama et al. | |
| 7,089,202 B1 | 8/2006 | McNamar et al. | |
| 7,308,426 B1 | 12/2007 | Pitroda | |
| 7,426,530 B1 | 9/2008 | Rosko et al. | |
| 9,697,524 B1 * | 7/2017 | Fischer | G06Q 30/016 |
| 10,484,542 B1 * | 11/2019 | Rager | H04M 3/5183 |
| 2001/0020236 A1 | 9/2001 | Cannon | |
| 2001/0023407 A1 | 9/2001 | Liyanearachchi et al. | |
| 2002/0026410 A1 | 2/2002 | Woloshin et al. | |
| 2002/0026449 A1 | 2/2002 | Azencott | |
| 2002/0026462 A1 | 2/2002 | Shotton, Jr. et al. | |
| 2002/0038226 A1 | 3/2002 | Tyus | |
| 2002/0038363 A1 | 3/2002 | MacLean | |
| 2002/0042808 A1 | 4/2002 | Smith et al. | |
| 2002/0059141 A1 | 5/2002 | Davies et al. | |
| 2002/0065735 A1 | 5/2002 | Hatakama et al. | |
| 2002/0065814 A1 | 5/2002 | Okamoto et al. | |
| 2002/0069105 A1 | 6/2002 | de Rosario Botelho et al. | |
| 2002/0123948 A1 | 9/2002 | Yumoto | |
| 2002/0143614 A1 | 10/2002 | MacLean et al. | |
| 2002/0188533 A1 | 12/2002 | Sanchez et al. | |
| 2006/0013367 A1 * | 1/2006 | Sawyer | H04L 51/14 379/88.01 |
| 2006/0080243 A1 | 4/2006 | Kemper et al. | |
| 2007/0044095 A1 * | 2/2007 | Banerjee | H04L 63/08 717/176 |
| 2007/0203786 A1 * | 8/2007 | Nation | G06Q 10/06375 705/7.42 |
| 2007/0250508 A1 * | 10/2007 | Oxenstierna | G06Q 10/06 |
| 2009/0006164 A1 * | 1/2009 | Kaiser | G06Q 10/06 705/7.14 |
| 2013/0268260 A1 * | 10/2013 | Lundberg | G06F 17/28 704/8 |

OTHER PUBLICATIONS

Ribiero-Neto, et al., Top-Down Extraction of Semi-Structured Data, IEEE 6th International Symposium on String Processing and Information Retrieval Symposium, 1999, pp. 176-183.

Ricardo Baeza Yates, et al. Modern Information Retrieval, ACM Press, NY, Addison Wesley, 1999, pp. 117-139, 1999.

Daniel Schutzer, Get Ready for Electronic Commerce, ABA Banking Journal 87.6, Jun. 1995, p. 47-50.

* cited by examiner

| PrincipleID | Type | Name |
|---|---|---|
| 5123121 | Role | Portal Admin |
| 122331 | Role | Executive |
| 2122551 | Role | Retail Branch Manager |
| 8838281 | Role | Retail Associate |
| 1938721 | Role | Loan Officer |
| 3939281 | Role | Customer Service Rep. |
| 81303912 | Role | Fraud Specialist |
| 8128238 | User | John Doe |
| 1919821 | User | Alex Smith |
| 100001983 | User | Caitlin Mary |
| 3838282 | Application | CCL |
| 1938381 | Entity | TaxAssistance LLP |
| 822 | Entity | SEC |
| 2929393 | Computer | PC122551_XD |

FIG. 12A

| ActivityID | Type |
|---|---|
| create_app | Create a loan application |
| edit_customer | Edit existin customer information |
| create_customer | create customer account |
| view_app | view selected application |
| initiate_eod_p | initiate end of day process |
| trans_view | transaction view |
| background_check | initiate background check |
| import_useres | import users |
| add_comment | add comment |
| add_attachments | add file attachment |
| add_task | add task to profile |
| complete_workflow_task | complete current workflow task |

FIG. 12B

| ApplicationID | Application Name | Description |
|---|---|---|
| 23456 | AES | Event Services Software |
| 0 | BAS | Business Application software |
| 34912 | Branch PM | Branch PM |
| 34895 | CCL | Customer Library |
| 25005 | CFW | CFW |
| 82748 | ESDS | Enterprise Service Delivery System |
| 83550 | FraudPrevent | Fraud assistant software |
| 81369 | FSDS | Retail Financial service |
| 81431 | Xc Rates | Exchange rates |
| 35672 | HR APP | Human resources |
| 2 | CollectionsAssist | Collections assistant software |
| 81449 | Privacy | Privacy settings |
| 34726 | LoanHelper | Loan applications |
| 81258 | TransferSoft | Transfer assistant |

FIG. 12C

| Principle | ActivityID | Type |
|---|---|---|
| Portal Admin | create_app | Create a loan application |
| Portal Admin | edit_customer | Edit existin customer information |
| Portal Admin | create_customer | create customer account |
| Loan Officer | view_app | view selected application |
| Loan Officer | initiate_eod_p | initiate end of day process |
| Loan Officer | trans_view | transaction view |
| Loan Officer | create_app | Create a loan application |
| Fraud Specialist | edit_customer | Edit existin customer information |
| Fraud Specialist | create_customer | create customer account |
| Fraud Specialist | view_app | view selected application |
| Fraud Specialist | initiate_eod_p | initiate end of day process |
| Caitlin Mary | trans_view | transaction view |
| Caitlin Mary | import_users | import users |
| Caitlin Mary | add_comment | add comment |
| Alex Smith | add_attachments | add file attachment |
| Alex Smith | add_task | add task to profile |
| Customer Service Rep. | view_app | complete current workflow task |
| Retail Branch Manager | grant_loan | finalize and grant loan |
| PC122551_XD | add_attachments | export or generate a report |

FIG. 12D

Access Control Configuration

Application Details
Name: LoanHelper Application
Made by SystemSoft: v. 5.1
URL: http://12.14.52.56/LoanHelper
Primary Use: Used by Loan Division. Application team
Associated Role: Portal Admin, Loan Officer, Manager

- Associated Roles
- Create Activities
- Enable/Disable Activities
- Access Control

| ActivityID | Type | |
|---|---|---|
| create_app | Create a loan application | PERMIT |
| edit_customer | Edit existin customer information | PERMIT |
| create_customer | create customer account | PERMIT |
| view_app | view selected application | PERMIT |
| initiate_eod_p | initiate end of day process | DENY |
| background_check | initiate background check | DENY |
| add_comment | add comment | PERMIT |
| add_attachments | add file attachment | PERMIT |
| export_report | export or generate a report | PERMIT |

Applications → Principle Configuration → Activities Configuration → Application Activities → Access Control Configuration

FIG. 15E

ENTERPRISE FULFILLMENT SYSTEM WITH DYNAMIC PREFETCHING CAPABILITIES, SECURED DATA ACCESS CAPABILITIES AND SYSTEM MONITORING

REFERENCES TO RELATED APPLICATIONS

The present application claims priority to, and is a continuation-in-part of, U.S. patent application Ser. No. 13/480,068, filed on May 24, 2012, entitled, "Enterprise Fulfillment System with Dynamic Prefetching Capabilities," and claims priority to U.S. Provisional Patent Application No. 61/904,772, filed on Nov. 15, 2013, entitled, "Enterprise Fulfillment System with Dynamic Prefetching Capabilities, Secured Data Access Capabilities and System Monitoring," both of which are incorporated herein by reference in their entirety.

FIELD OF THE INVENTION

Embodiments of the present invention are related generally to systems and methods for managing customer requests for information, resources and services for an institution containing a plurality of business units, including the dynamic delivery of information for processing such requests.

BACKGROUND OF THE INVENTION

Financial institutions offer customers a wide range of services related to banking, investments, loans and other financial services. While international banks may offer their customers more services than their regional counterparts, banks, in general, operate in a similar fashion regardless of their size. The various essential aspects, products, and lines of business of banks are often compartmentalized and separated into individual units, with each unit responsible for a unique function of the bank. For example, one unit may be responsible for processing applications, another may be responsible for processing deposits, and yet another may be responsible for claims and dispute resolutions. Other types of units may be responsible for the financial institution's credit card, insurance and investment related lines of business. By having requests and issues resolved by specialized units of experienced professionals trained in handling particular issues, cost-efficiency and effectiveness may be maximized.

However, as banks and their units grow, so does the complexity of incoming customer requests that may be received through any number of channels of any number of business units. Often the case, incoming requests contain multiple individualized requests, each of which must be processed and resolved by a particular unit. Moreover, individual requests often require the help and input of multiple units at the bank in order to fully resolve the issues. For example, in response to a notice from a customer that his account has not been fully credited with a check deposit, a unit responsible for check deposit claims may need to communicate with a debit account unit to get the customer account information; a reconcilement services unit to settle the differences with another bank; a retail claims deposit unit to resolve additional issues; and so on. Such inefficiencies may be partly attributed to the compartmentalization of customer information by the units, as each unit may store unique information about the customer and his or her accounts. This often leads to incomplete awareness of information among the business units and incomplete or incorrect responses to customer requests. The deficiencies of currently available systems become even more apparent as the customer requests become more complex.

With so many different units in a financial institution, the channels that are available to customers are numerous. Because customers are not well versed in the functional capabilities of every financial unit in a financial institution, the proper branch and channel for customers to submit requests are often unclear. The customers are left with difficult decisions, often resorting to blind guessing.

Furthermore, in order to fulfill customer service requests, users must have access to applications, services and data from all of the relevant sources. But, the resources necessary to fulfill such requests may vary greatly across an organization and from employee to employee. Employees, for instance, may have different responsibilities, capabilities, security clearances, and so on, each of which may dictate what resources should be accessible to each employee. Indeed, such entitlements may change from day-to-day based on business needs, entitlement requirements, regulations, and other factors. Ultimately, it is currently expensive, time-consuming and overly-burdensome to manage these entitlements on a manual basis and to reallocate employees while properly adjusting entitlements.

In addition, training is an essential tool to ensure that customer requests are being proficiently fulfilled. Indeed, employees must be adequately trained to properly utilize the applications, services and data that they would use when working with a customer. However, at present, access to such tools are not necessarily tied to the completion of any training, thereby allowing employees with little to no experience to have access to important customer data. Even where an employee is restricted from access to particular information until he or she completes training, the process of providing access to applications, information and other data based on this completion, is a manual and time-consuming process.

Accordingly, there is an essential need for a solution that can improve the experience of the customers and the efficiency of the financial institution in managing and processing customer service requests, including by dynamically providing the resources and information of the various units in a flexible, variable and portable manner as the requests are received over any number of channels. Further, the solution should reduce the complexities of service requests from the perspective of the customer, including by not requiring the customer to have integral knowledge of an institution's organizational structure when placing requests. Further still, the solution should dynamically manage entitlements and security while efficiently providing access to applications, services and data necessary for the processing of customer service requests.

SUMMARY OF THE INVENTION

The present invention fulfills current needs by providing a method and system for processing customer information and requests at a central fulfillment hub in which requests from customers may be received across a plurality of channels. The fulfillment system may apply a library of specific rules to systematically resolve the customer requests or engage resources necessary to resolve such requests. The fulfillment system may open a request, pre-retrieve the information necessary to fulfill the request, performs the necessary operations to resolve the request, and close the request accordingly.

In embodiments of the present invention, resources, data, and other information previously compartmentalized in individual units may be centrally located or at least shared among all units during operation in a consolidated manner through dynamic retrieval operations. This allows the needs of a customer to be fulfilled through accessing and utilizing the shared resource pool of customer account information as they may relate to any and all units within the bank, minimizing intra-unit requests and increasing the efficiency and the speed at which a request may be resolved.

Embodiments of the present invention allows for the dynamic retrieval and delivery (i.e., "prefetching") of customer information and resources as a customer request is received at the bank and prior to any processing of the request for resolution. Specifically, based on even minimal customer-provided information, such as an account number, the present invention prefetches all customer information, including account(s) information, preferences, and other information, across all aspects and relationships the customer may have with the bank—all of which may be necessary to fulfill the customer request. For example, based on an account number, the customer information and all of his or her other accounts with the bank (e.g., mortgage account or a credit card account) may be retrieved.

Further still, the present invention may analyze the request and dynamically retrieve any data that may be necessary to fulfill the request, such as a particular transaction in a particular account, taking into consideration, for example, the type of request and the specific subject of the request. Various queries may be executed to retrieve portions of information from various databases and other sources based at least on account status/attributes, request types and the answers received from such queries.

In addition to customer information, customer preferences may also be retrieved automatically prior to any resolution of the request. Customer preferences may be fully configured by a customer and may relate to any number of accounts, transactions, channels, and/or other aspects pertaining to the customer's financial relationship and interaction with the financial institution. For example, a customer may configure interaction-related preferences, such that the financial institution only contacts the customer through a particular method and/or channel (e.g., once a day via email) with respect to service request inquiries, account alerts, or other issues. Security-related settings may also be configured, such that the customer may define the person(s) authorized to access the account and the person(s) authorized to take particular actions on the account. Customer configuration options that are available to a particular customer may vary depending on the type of account. Higher priority accounts, such as enterprise or executive accounts, may allow for additional preferences to be configured. Customer preferences may also affect the type and amount of information that is pre-retrieved. Thus, a customer may set the preferences with any number of banking-related aspects and such preferences may automatically be pre-retrieved prior to the processing of any requests.

In one embodiment, the information retrieved may be partly determined by the customer interaction history. For example, the amount of information retrieved may be affected by the number and types of service requests submitted in the last 24 hours, the last week, or other definable time-frames by a certain customer.

In practice, all of the customer information and resources necessary to fulfill a specific customer request may be automatically presented to a bank associate through a unified user interface, allowing the associate to fully and efficiently determine the proper resolution. In one embodiment, the system provides the bank associates with a list of one or more proposed actions for approval by the associate. The proposed operations may be actions that are not autonomously taken without manual/human approval. In another embodiment, customer requests may be automatically generated based on detected accounts or system status, with the information necessary to resolve a request automatically retrieved, and the request automatically fulfilled by providing the customer with a solution.

Embodiments of the present invention further provide for the management of employee entitlements through the assignment of employee roles, where each assigned role may be associated with a set of entitled applications, services, and data. Employees may be assigned a plurality of roles according to their training history, business needs, security requirements, employee history, and even system status. Indeed, in one embodiment, managers can dynamically assign roles based on current system demand, number of pending customer requests, and other factors on a real-time basis. The system may then be automatically updated to notify and provide employees with instant access to the additional resources and to route calls and requests to the newly assigned employee accordingly. In one embodiment, the entitlements to particular applications, information or other data may be dynamically adjusted according to user feedback, system performance and status, and even historical data, as analyzed by an analytics engine.

In the preferred embodiment, access to sets of applications, services and data are dependent, not only on managerial assignments, but also on the completion of training courses or the performance of particular actions. Thus, in this embodiment, the system will actively track the completion of the required tasks and upon such completion, will provide the employee with access. Managers may also be automatically notified that the employee is qualified to fulfill particular roles. In various embodiments, managers are assigned to manage one or more sets of employees in accordance with assigned roles, functions within ESDS workflows, or corporate hierarchy. Thus, managers may, on a real-time basis, assign additional employees to particular workflows, provide additional access to applications, services or information, and require additional trainings, amongst other functions.

In one embodiment, the system supports processing of service requests by assigning service requests based on crowdsourcing. Participants who have completed required training for a type of service request may actively seek and bid on service request contracts and may be automatically assigned roles and its associated applications, information and data, upon grant.

In one aspect of the present invention, a fulfillment system for providing services to a customer in response to a customer request through one or more channels is disclosed to include a request receiving engine and a request processing engine. The request receiving engine is connected to the one or more channels to receive the customer request while the request processing engine is programmed to process the customer request. In particular, the request processing engine is programmed to receive the customer request from the request receiving engine and analyze the customer request to determine the customer information that may be necessary to fulfill the customer request. Based on this analysis, the request processing engine is programmed to collect the customer information from at least a plurality of business unit engines. This collecting is also referred to as "prefetching." Finally, the request processing engine is further programmed to process the customer request based on the collected customer information.

In at least one embodiment, the request processing engine is programmed to automatically perform the analysis of the request received and to collect the customer information in response to the opening of a customer request record. Furthermore, the request processing engine may collect all customer information necessary to fulfill the customer request before processing the customer request and may collect such information from an external source, such as an external financial institution's system or a regulatory agency's system. The request processing engine may be further programmed to automatically resolve the customer request without any approval from an associate. In certain cases however, the request processing engine may present the collected information to an associate for processing.

In at least one embodiment, customer preferences and customer interaction history may affect whether a customer request is automatically resolved by the system or whether an associate approval is required. Further still, in one embodiment, the actions taken may be partly based on the Service Level Agreement(s) ("SLA") between the customer and the financial institution, by the account type, and by other attributes of the customer-financial institution relationship.

In at least one embodiment of the present invention, the status of a customer request is dynamically tracked throughout the pendency of the request—from receiving the request, prefetching customer information, processing the request, and closing the request—and even after the request is closed. Thus, embodiments of the present invention allow customers and associates to review and examine the status of any number of requests. A customer may review the status of the request from any available channel at the customer's disposal, even if the customer did not provide the particular request through the same channel. This further allows the financial institution to provide and/or alert the customer request through any channels for a variety of purposes, such as to provide the customer with notice that the status of his or her service request has changed (e.g., prefetching is complete and request processing has begun). In at least one embodiment, the customer may be provided with the status of a request according to previously-defined customer preferences.

In another aspect of the present invention, a computer-controlled method for providing services to a customer in response to a customer request through one or more channels is disclosed. The method includes the step of receiving, using at least one processing unit, the customer request at the one or more channels. Furthermore, the method includes the step of analyzing the customer request to determine customer information necessary to fulfill the customer request and to collect the customer information from at least a plurality of business units based on the step of analyzing. In addition, based on the collected customer information, the method further includes the step of processing the customer request.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 12A depicts an exemplary table of the activity database in accordance with an embodiment of the present invention.

FIG. 12B is an exemplary table of the principle database in accordance with an embodiment of the present invention.

FIG. 12C depicts an exemplary table of the application database in accordance with an embodiment of the present invention.

FIG. 12D is an exemplary table of the access control database in accordance with an embodiment of the present invention.

FIGS. 15A-15E provide exemplary user interfaces that may be accessible by a manager to define the parameters of entitlements in accordance with an embodiment of the present invention.

DETAILED DESCRIPTION OF THE INVENTION

Figure 1A:
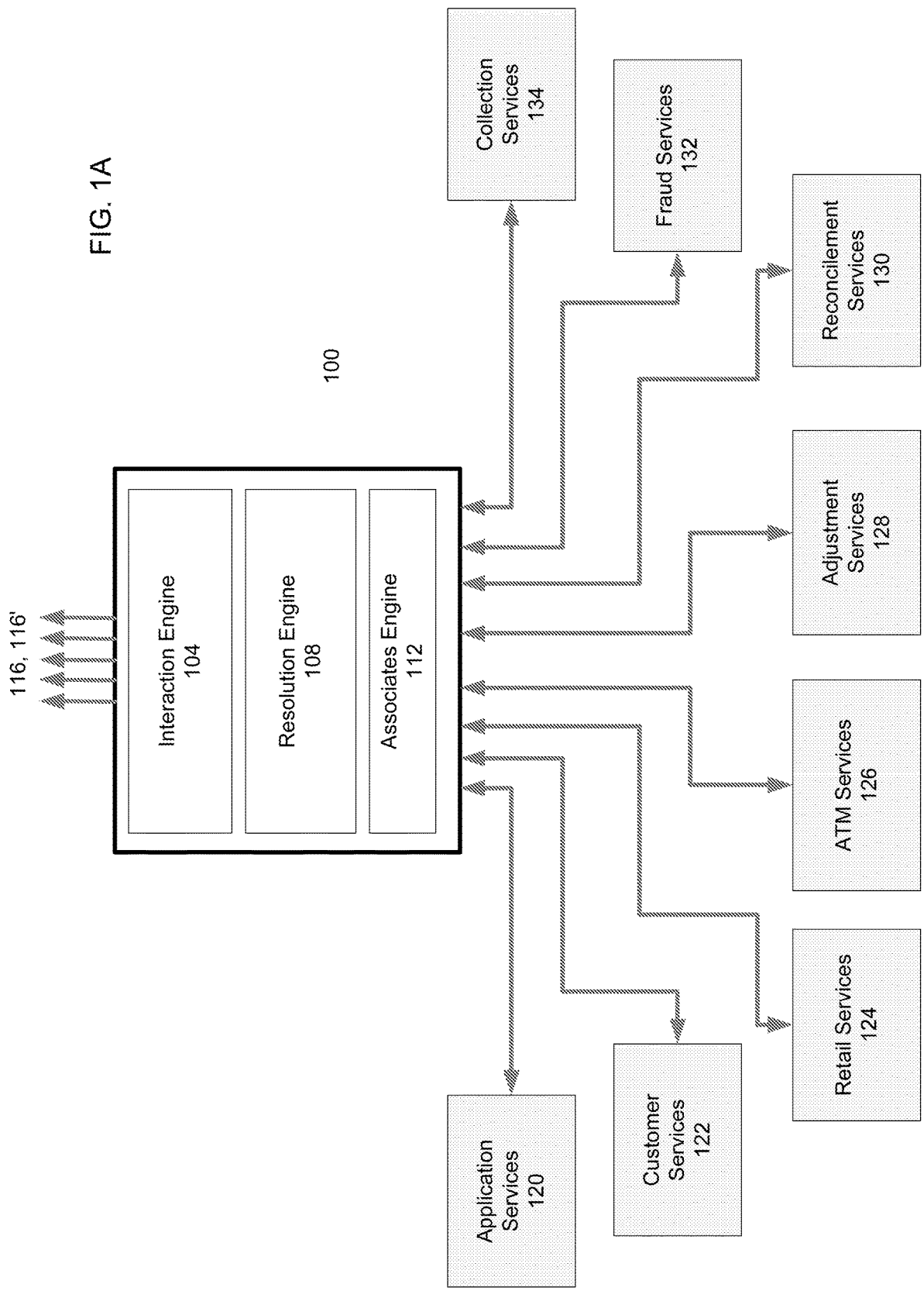
FIG. 1A is a block diagram illustrating a fulfillment system in accordance with an embodiment of the invention.

FIG. 1A depicts a block diagram illustrating a fulfillment system in accordance with an embodiment of the present invention. The fulfillment system 100 includes an interaction engine 104, a resolution engine 108 and an associates engine 112. The fulfillment system is connected to a plurality of channels 116-116' and a plurality of business unit systems 120-128, such as application services system 120, customer services system 122, retail services system 124, ATM services system 126, adjustment services system 128, reconcilement services system 130, fraud services system 132, and collection services system 134. The fulfillment system 100 operates as a fulfillment hub in which all service requests are dynamically received over the plurality of channels 116-116'. The requests are processed, resolved, and closed by the various engines of the fulfillment system 100. A broad overview of the invention will be discussed, followed by a more detailed discussion of the capabilities and features of the interaction engine 104, the resolution engine 108 and the associates engine 112.

The interaction engine 104 receives the service requests over channels 116-116', processes the requests to determine the type and scope of the request and, in most circumstances, operates as the intermediary between the customer and the resolution engine 108. The interaction engine 104 may be said to determine the customer's story—e.g., to determine what has caused the customer to contact the bank, what problems have occurred, and what needs to be fixed. The interaction engine 104 may facilitate the customer's placement of the service request by controlling what questions are asked of the customer and utilize the answers to determine the type of service request the customer is placing.

The interaction engine 104 may facilitate the interaction with the customer according to the channel through which the customer has chosen to enter his or her service request. In several preferred embodiments, the interaction engine 104 comprises a plurality of applications that, when executed, facilitates the interaction over one or more channels. The interactions with the customer, such as the questions asked and the manner at which the interactions take place may differ from channel to channel. In one preferred embodiment, the interaction engine 104 may apply a standard library of specific rules or policies that determines how the applications operate to gather information about the service request and determines the type and/or scope of a service request. As a result, the interaction with a customer across the various channels, while differing in medium or structure, may be standardized. For example, the questions that are asked, be it by utilizing automated voice, text or graphics, may be the same across all channels.

Once the type of request is determined, the information making up the customer's request may be communicated to the resolution engine 108, where the resolution engine 108 operates to resolve the service request. Whereas the interaction engine 104 may be responsible for answering questions such as "How can we help you?" the resolution services engine 108 may be described as answering the question: "What needs to be done?" In particular, in response to service request information, the resolution engine 108 may open a service request, gather the necessary information to resolve the request, work on the request, and close the request. Like the interaction engine 104, the resolution engine 108 may apply a standard library of specific rules to systemically resolve the customer request or engage resources to achieve final resolution.

The resolution engine 108 determines the information necessary to fulfill such requests according to the request type, transactional and profile information, preferences, business unit requirements, regulatory guidelines, history and other system policies. In the preferred embodiments, the resolution engine 108 gathers at least all of the information that may be necessary to fulfill the service request received. The resolution engine 108 may anticipate and collect information and resources that may be required for related or anticipated requests. It may gather additional information that it anticipates may be necessary to resolve related requests or requests that may be additionally entered by the customer.

The resolution engine 108 may collect the customer information from a plurality of business unit systems 120-128, each of which may store such information in a number of manners well known in the art. For example, in one embodiment, each of the business unit systems operate independently from one another, each containing a database storing customer information related to the operations of the particular business unit. In such embodiments, the resolution engine may gather the necessary information from one or more of these databases at the various business unit systems.

The resolution engine 108 gathers all customer information necessary to resolve the customer request prior to the processing of the customer request, unlike known implementations. Typically in currently available systems, customers with particular service requests may contact a specific unit of a bank charged with servicing that type of request. Even when the customer contacts a general customer service point of contact, the customer is forwarded to the specific unit for processing according to the service request type. Even though, from a customer perspective, his or her service request is a singular request, such requests may in actuality contain a plurality of sub-requests from the perspective of the financial institution. Because of the compartmentalized structure of financial institutions, each of these sub-requests may require customer information of, authorization from, and, otherwise, access to other business units and their systems. As a result, a portion of the information necessary to resolve a request may be gathered when the customer first enters his request, another portion may be gathered by a customer associate in response to additional questions, and another portion may be gathered by another business unit, and so on. The customer may be repeatedly transferred from one unit to another and asked repetitive questions with each transfer (e.g., "What is your account number?", "What problems are you having?"). Thus, whereas currently available systems known in the art may gather information about the customer while processing the customer request, preferred embodiments of the present invention gather, or "prefetch" all information necessary according to the type of request prior to any processing. The information is gathered by the resolution engine and utilized as necessary in resolving the customer service request.

Once information has been prefetched, the resolution engine 108 proceeds to resolve the service request. The resolution engine 108 may automatically resolve customer requests that do not require approval from an associate of a bank. These requests may be simple administrative service requests such as changing account profile information or statement delivery preferences. The resolution engine 108, in certain embodiments, may also automatically process service requests that involve minimal financial risks to a customer and/or the financial institution. Thus, requests related to a transaction amounting to $50 or less may automatically be processed by the resolution engine 108. The resolution engine 108 may communicate with one or more business unit systems 120-128 to request certain actions at the business unit system to resolve the request. For example, the resolution engine 108 may request that a transaction's entered value be changed to reflect the correct transactional value. In response, the various business unit systems 120-128 may perform such tasks and communicate the results back to the resolution engine 108. In at least one embodiment, the resolution engine 108 may have access to the databases of the business unit systems 120-128 and may make direct changes to the database as necessary. This may increase efficiency and the speed of request resolution.

In contrast, service requests that require associate approval may be provided to an associate for review. In particular, the associate may receive information describing the customer request on a user interface generated by the associates engine 112. The associate may further be provided with all of the prefetched information gathered and communicated by the resolution engine 108, allowing the associate to view all of the customer information necessary to resolve the customer request. The customer information from the various business unit systems 120-128 may be aggregated, transformed and/or displayed on the user interface in an easy to understand manner. The resolution engine 108 may further provide the associates engine 112 with the description of the actions that the resolution engine 108 will take to resolve the request. The associates, through the user interface, may approve, deny or make changes to the list of action items. Upon approval by the associate, the associates engine 112 may cause the resolution engine 108 to perform the necessary tasks to resolve the customer request in similar fashion to procedures taken by the resolution engine 108 for requests that do not require approval for processing. Furthermore, the associates engine 112 may allow the associate to manually perform any and all tasks in order to resolve the service request.

Once the actions necessary to resolve a request have been completed, the resolution engine 108 may communicate the results of the actions and may automatically close a customer request. When a service request is received over a communication channel through which the customer is present, such as a service request received over the telephone channel by a customer placing a call with his mobile phone, the results may be communicated from the resolution engine 108 back to the interaction engine 104 for communication to the customer over the channel 116. In at least one embodiment, the interaction engine 104 may confirm that the customer is satisfied before closing the service request. The interactive engine 104 may further ask if there are additional service requests. If so, it processes the customer requests and forwards the information to the resolution engine 108 in a similar fashion for processing. In certain embodiments, when a customer request is received through a communication channel where the customer is not present, such as when a request is automatically generated by the system or an engine of a related system, request information or results may not be communicated back over a communication channel 116.

Figure 1B:
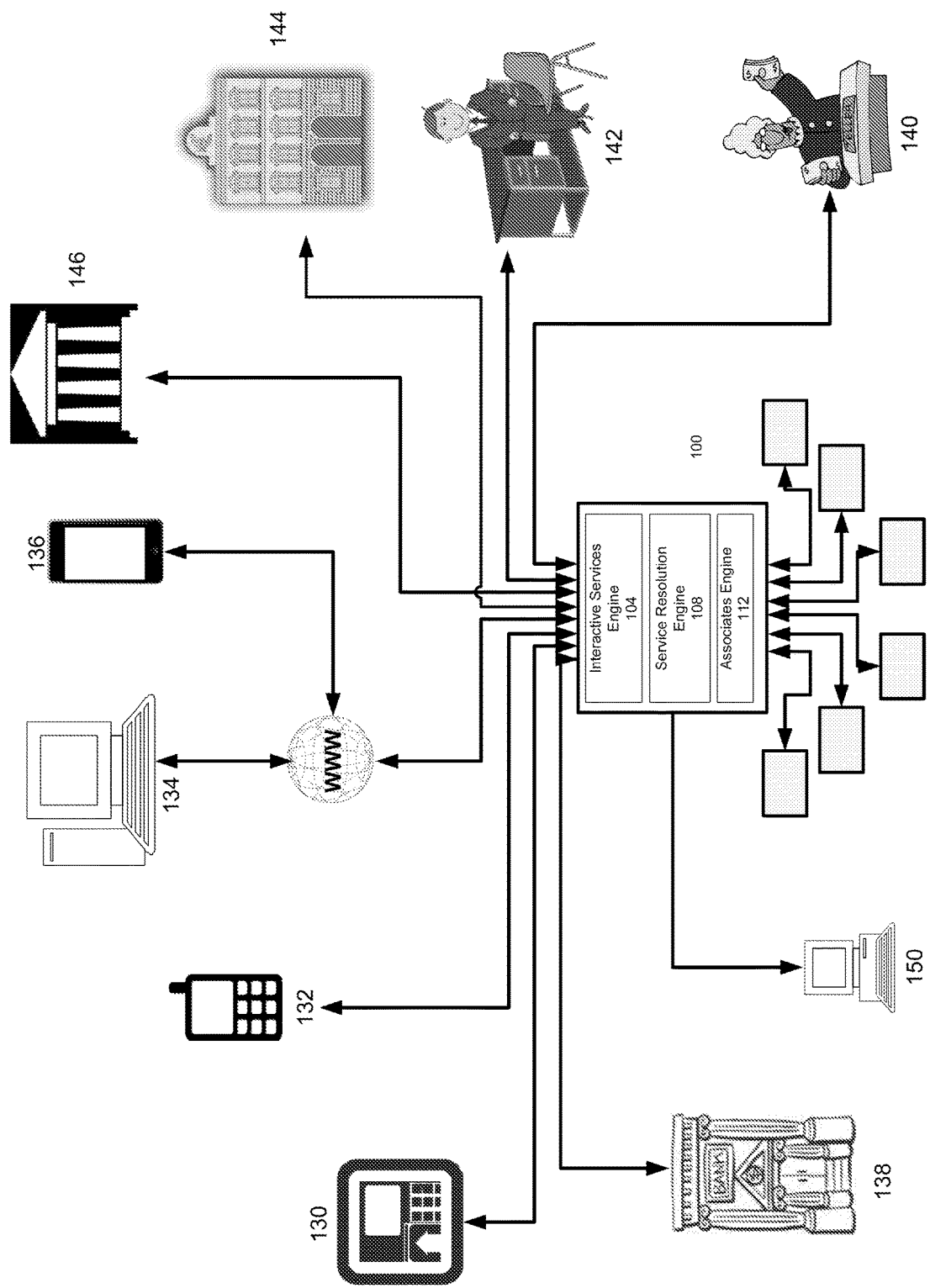
FIG. 1B is a block diagram illustrating an operating environment for the fulfillment system in accordance with an embodiment of the invention.

As seen in FIG. 1B, the fulfillment system 100 and the customer may interact through a plurality of channels, which may include, but are not limited to ATM channel 130, telephone channel 132, online/website self-service channel 134, mobile application and/or website self-service channel 136, branch channels 138, teller channel 140, service desk channel 142, external financial institution channel 144, and regulating agency 146. In several embodiments, customers may interact with the fulfillment system 100 in various other channels, both digital and otherwise, including application-based channels (Windows or Mac applications, iOS, Android or Windows Mobile-based applications) print-based channels (e.g., letters), and others well known in the art.

Customers may also interact with the fulfillment system 100 through one or more social network channels (not shown). For example, the customer may send a service request through his or her Facebook account to a Facebook account associated with the financial institution and/or the fulfillment system 100. The fulfillment system 100 may be configured to interact with the customer by replying, asking responsive questions and providing the status of the customer's request(s), for example. In at least one embodiment, the messages sent to and from the fulfillment system 100 over the social network may be privately viewable to only the customer. In another embodiment, the sensitive information (e.g., account or financial information) may be hidden from the public. The customer's use of the social network may further allow the fulfillment system 100 to collect additional customer-related information in responding to the customer's request including authenticating the user or determining fraudulent account behavior.

Furthermore, associates and administrator computer 150 may be connected to the fulfillment system 100, allowing an associate or an administrator of the fulfillment system 100 to perform various operations. In certain embodiments, service requests may also be received from the plurality of business unit systems 120-128 as well and depending on the service request, may or may not be related to a customer account.

Customers at ATMs, for example, may transmit service requests over ATM channel 130 through the use of the user interface at the ATM and submit requests related to actions taken at the ATM or to the account information from which he or she is accessing. Similarly, service requests may be communicated from customers by calling a service telephone number and communicating his or her service request over the telephone channel 132. The telephone channel 132 may allow the customer to talk to an interactive voice response (IVR) unit and in some cases, allow the customer to talk to an associate at a call center. Furthermore, similar service requests may be communicated over the online/website self-service channel 134 by a user accessing the public website of the bank. The customer may have to log into his or her account and submit the request service through the use of a website user interface, through a chat window or other known methods. Customers may similarly submit service requests using their mobile devices over mobile applications and/or website self service channel 136 either by accessing a device-based application or a mobile website of the financial institution.

Requests may also be received from branch bank offices over branch channel 138. Such requests may often be communicated by a branch office associate who is working with a customer at the branch office location, for example. Similarly, requests may be received at a financial institution's designated service desks. These may be, for example, customer service departments or business units within the bank that receive customer requests. A service request may also be received by tellers of the bank over teller channel 140. The teller may need certain actions to be taken with regard to a customer's account or with regard to other bank-related matters. Furthermore, service requests may be received from external financial institutions over channel 144. For example, another bank may ask that a particular amount be withdrawn from a customer's account and transferred to that bank. Financial institutions may also include external third-party financial services entities such as FIS, which provide various financial services for a bank. A service request may also be received from a regulating agency over channel 146, such as the United States Federal Reserve.

A customer may reach an associate of the financial institution for help through any of the channels. For example, even where the customer utilizes a telephone/IVR channel to communicate a service request, he or she may be forwarded to a call center associate for further assistance, or in some cases, for approval of the actions to be taken by the fulfillment system 100. Similarly, an associate may call a customer in response to a service request received over the ATM or through a mobile application. Indeed, an associate may receive the service request and all prefetched information at the time, or just prior to, speaking with the customer. In another embodiment, an associate may receive customer requests over any of the channels but may approve, deny or modify actions to be taken to resolve the request without having direct contact with the customer.

The fulfillment system 100 has the capability to receive service requests over communication channels at which customers are present or at least represented by a financial institution representative or system. For instance, customers may be present or represented when requests are submitted over the ATM channel 130, telephone channel 132, online/website self-service channel 134, mobile application and/or website self-service channel 136, branch channel 138, service desk channel 142, and/or teller channel 140. The present invention may further receive and process service requests that are not at the request of any customer. Indeed, the present invention may process service requests that are automatically generated by the system. These requests may be automatically generated when the system detects system conditions that require resolution. For example, a service request may automatically be generated at an ATM when it is detected that a customer deposit was not accurately entered and processed. As another example, a service request may automatically be generated and processed by the system when it is detected that the customer's withdrawal may be fraudulent because the location of the withdrawal conflicts with information retrieved from social networks entries, devices, global positioning system (GPS) coordinates, and other sources. The service request may be communicated to the fulfillment system 100 and automatically resolved, even before the customer may determine that there was an issue with the customer's deposit. Indeed, customer requests may be automatically generated at any of the channels. Furthermore, requests may be received from other financial institutions and regulating agency 144 wherein the customer is not present or even related to the request or over any of channels. Indeed, service requests may be automatically generated based on the customer's interaction with the bank's website (self service channel 134) or mobile device (mobile device self service channel 136), at the teller's computer (teller channel 140), and so on.

In at least one embodiment, additional customer requests are dynamically generated by the system in response to an initial service request. For example, when a customer requests a deposit amount adjustment, the system may not only credit the proper amount to the customer's specified account, but it may further create additional requests to resolve the discrepancies with other branches of the financial institution or aspects related therewith. Thus, in at least one embodiment, the original service request may be customer-oriented and cause actions to be taken directly related to the customer's account(s), while additional service requests may be generated by the system that causes the system to take action directed towards the institution's financial standings, regulatory duties, and other aspects of the institution. These additional service requests may not be necessary to resolve the customer's request, from a customer perspective. For example, additional requests may be dynamically generated by the system to request the credit amount from the transferor's financial institution. A service request may also be generated to report the action(s) to a regulatory agency, for example. Thus, in these embodiments, the customer's service request may be resolved and closed in a timely fashion, independent of the financial institution's needs to receive the differences from the transferor's financial institutions or to take other similar actions.

Referring again to FIG. 1A, the business unit systems 120-128 depicted therein are exemplary computer systems of various business units that may make up a financial institution. While they are represented as individual discrete units, the various business units, in certain embodiments, may be interconnected or combined into one or more systems. Indeed, in at least one embodiment, the business fulfillment system 100 may be combined with one or more business unit systems 120-128. Furthermore, the business fulfillment system 100 may be incorporated into any existing computer systems of financial institutions or other entities. Modifications may be made to the fulfillment system 100 to allow it to communicate and interact with the various components, engines and systems at an existing financial institution and to perform the functions described in this disclosure. Similarly, the fulfillment system 100 may be modified to operate with any communication channel existing at a system of a financial institution.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The computer 400 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

It should be readily apparent to one of ordinary skill in the art that the presently disclosed invention may be implemented in a wide range of industries including any businesses and institutions that would benefit from a dynamic alert system capable of delivering notifications to customers or account holders in an optimized manner and actively responding to the customer as necessary. In the preferred embodiments, the presently disclosed invention is implemented for use by a financial institution, such as a bank. This is not meant to be limiting in anyway. Indeed, the present invention may be implemented in any number of industries.

The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

Interaction Engine

The interaction engine serves as the intermediary between the resolution engine and the request channels. The interaction engine 104 facilitates the customer's placement of the service request by controlling how service requests received at the various channels are processed to determine the type of service request the customer is placing.

Figure 2:
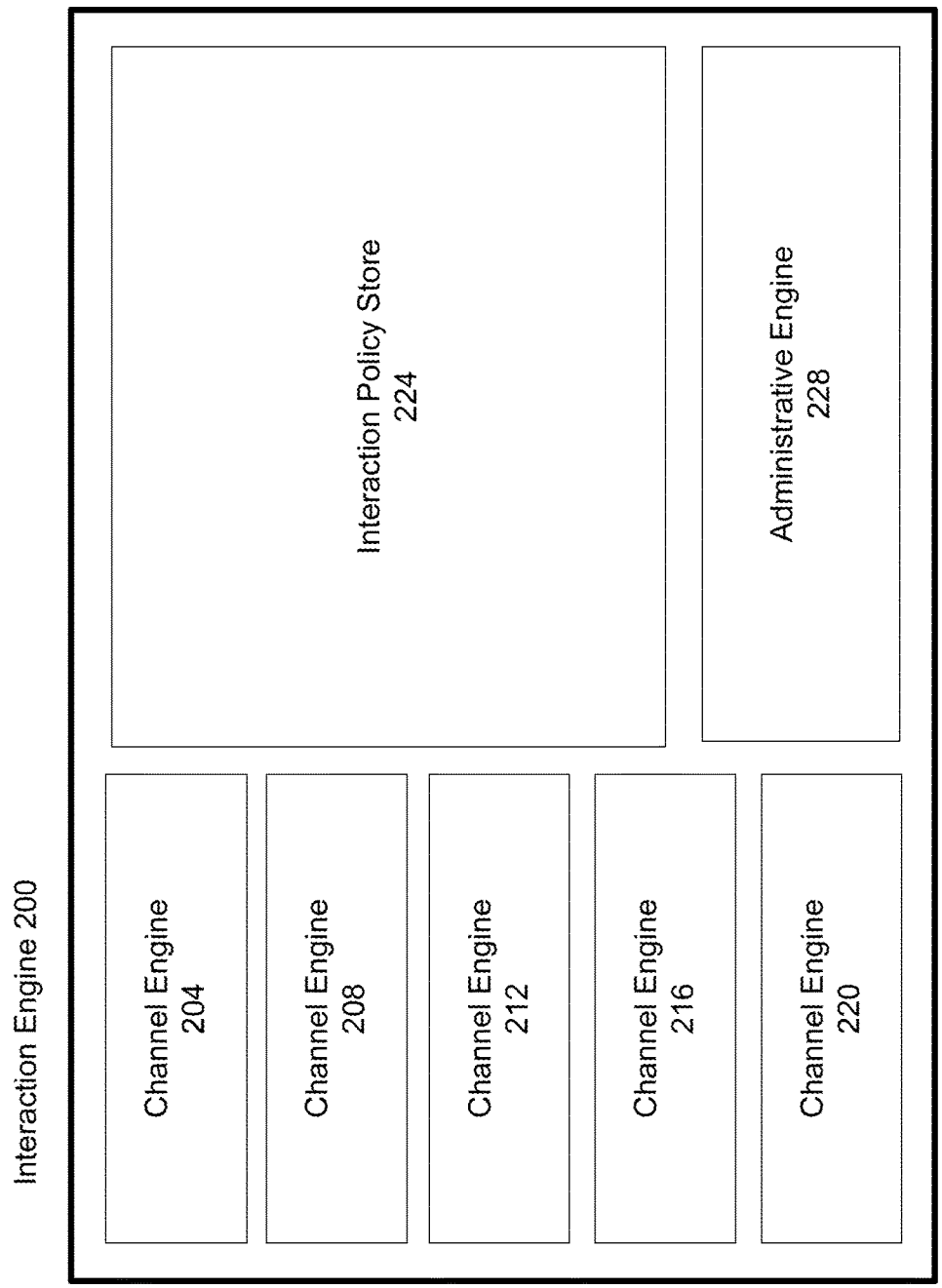
FIG. 2 is a block diagram illustrating the interaction engine in accordance with one exemplary embodiment of the invention.

FIG. 2 illustrates a block diagram of the interaction engine 200 in accordance with an embodiment of the present invention, comprising channel engines 204-220, interaction policy store 224, and administrative engine 228.

The interaction engine 200 may comprise a plurality of channel engines 204-220, each of which is configured to receive customer requests over a particular channel. For example, a channel engine 204 may be configured to receive customer requests over the telephone (e.g., telephone channel 132 of FIG. 1B). The channel engine 204 may also be configured to interact with the customer over the telephone through the use of an IVR unit. The channel engine 204 may receive a customer telephone call, greet the customer, generate computer-generated speech to be delivered to the customer inquiring what the customer may need and learn the details of the request. The telephone-responsive channel engine 204 may have capability to communicate and interact with the customer through dial tones or even through associates at a call center.

Another channel engine 208, when executed, may allow a customer to submit customer requests online by accessing the financial institution's website (e.g., over communication channel 134 of FIG. 1B). A customer may access the customer service section of a web page and be asked a series of questions generated by the channel engine 208. In response to the customer answers, the channel engine 208 may ask additional questions in response. For example, in response to the customer indicating that he would like to see an image of a check deposited last Thursday, the channel engine 208 may ask the customer for the account number. In some embodiments, the channel engine 208 may automatically determine the customer account information automatically, such as through the customer's log-in information, from which to process the customer requests and/or forward to resolution engine. In another embodiment, the channel engine 208 may allow a customer to interact with the bank through a chat interface. The channel engine 208 may generate questions or responses in response to the customer's chat messages in order to ascertain the details of the customer's request. In at least one embodiment, the customer may be provided with the customer's account and corresponding list of transactions. The customer may interact with the list of transactions provided and, for example, select the transaction(s) related to the customer's service request.

Similar processes may take place over other channels. Thus, channel engines 204-220 may interact with the customer to determine the type and scope of the customer's request through an interactive chat, text messages, messages with a teller and so on. Various channel engines may also be configured to receive service requests from financial institutions or a regulating agency as well.

Indeed, certain engines of channel engines 204-220 may be configured to simply receive requests over a particular channel and forward the requests to the resolution engine 108. In several embodiments, these channel engines may be configured to convert and/or modify the data in a manner that allows the resolution engine 108 to process the request and perform the actions disclosed herein.

The channel engines 204-220 of the interaction engine 200 may operate according to policies stored at the interaction policy store 224. Thus, the interaction engine 200 may be configured to operate according to a series of configurable rules or policies.

The interaction policy store 224 may contain a single standardize set of policy that determines the questions that are asked. In one embodiment, the interaction policy store 224 may include an interaction policy that when executed, represents a configurable interaction tree, where each leaf in the interaction tree may represent a request type. Thus, various channel engines 204-220 may access the interaction engine 200 and process the interaction tree. The channel engines 204-220 may traverse the interaction tree to determine the questions to ask and the actions taken in response to customer responses. Ultimately, the channel engine 204-220 may arrive at a leaf in the interaction tree and thereby, determine the service request type. In another embodiment of the present invention, interaction policies may be utilized to dynamically arrive at similar conclusions. These interaction trees may be stored in the interaction policy store 224 in a manner well known in the art, such as by use of configurable databases.

The interaction policy store 224 may contain a plurality of interaction policies for various circumstances. For example, the interaction engine 200 may be configured to utilize a particular interaction policy according to the channel, the source of the request (i.e., a branch office, a bank manager, lay customer), the location (i.e., time zone, zip code) of the request or even simply by the time of day. The interaction engine 200 may utilize certain policies according to current system conditions, such as when the system is under maintenance or when the system is overloaded with service requests.

The administrative engine 228 allows a user of the interaction engine 200 to define the policies at the interaction policy store 224, determine which policies are utilized based on any number of configurable rules, and configure the actions of each of the channel engines 204-220. In at least one embodiment, the administrative engine 228 may be an administrative engine that also controls the operations at other engines and components of the fulfillment system. The administrative engine may further allow an administrator or an authorized user to configure these rules through a user interface that it may generate, which may also be configured.

Figure 3A:
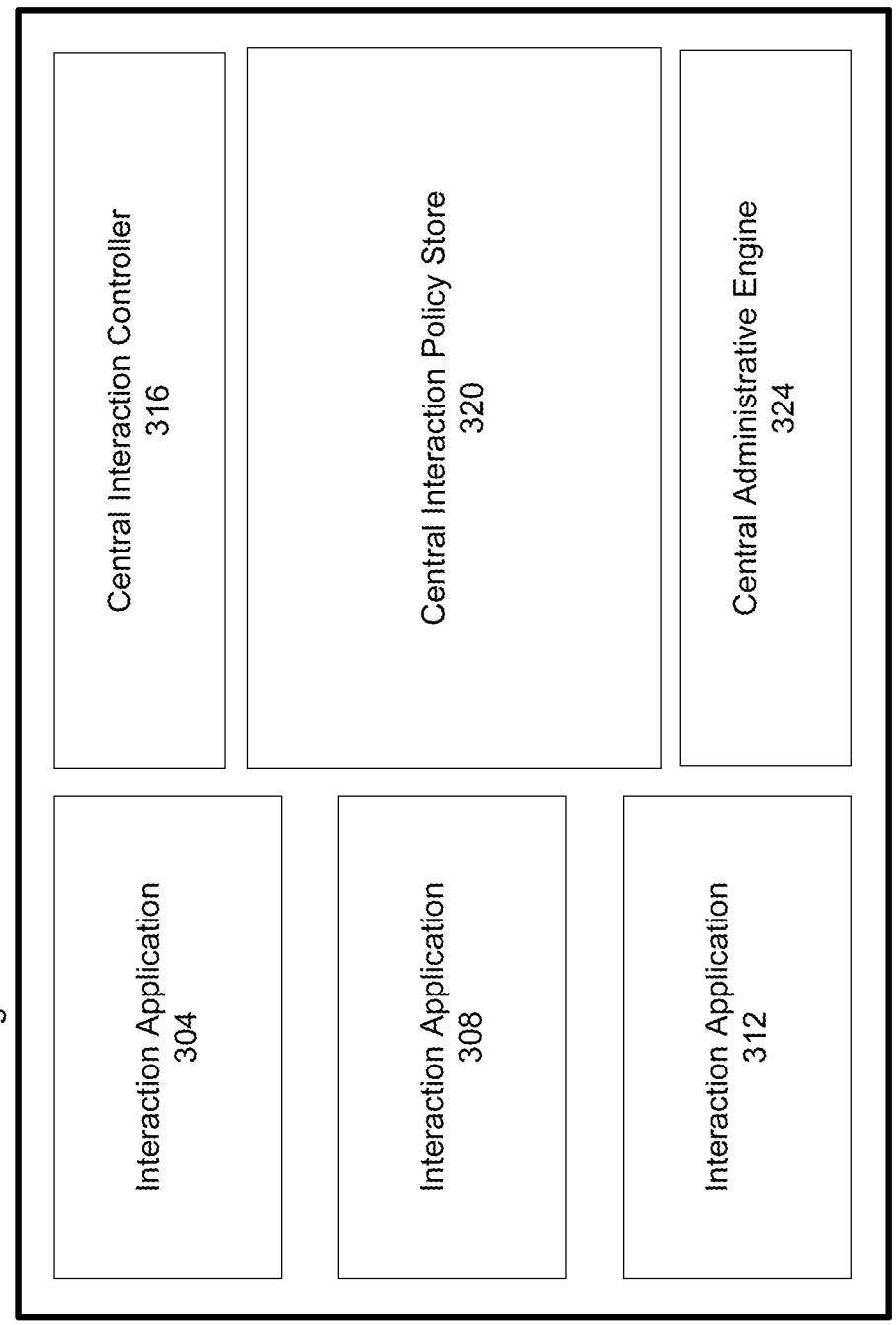
FIGS. 3A-3B are block diagrams illustrating the interaction engine in accordance with another embodiment of the invention.

FIG. 3A illustrates a block diagram of the interaction engine 300 in accordance with another embodiment of the present invention, comprising interaction applications 304-

312, central interaction controller 316, central interaction policy store 320, and central administrative engine 324.

Each of the applications 304-312 may be configured and utilized by a business unit of a financial institution to interact with a customer and to receive customer requests. An application may be utilized by the retail unit of a bank to receive customer requests over a plurality of channels that are related to the retail-aspect of the financial institution. Another application may be utilized by the telephone banking unit of the bank and yet another may be utilized by the treasury business unit to handle treasury related operations and service requests.

As evident from the discussions in other portions of this disclosure, the actions taken by one application may differ from that of another application, even substantially. For instance, the interactions of a requester and the application may differ if the application is associated with a retail unit of a financial institution versus if it is associated with a treasury unit of the bank. Customers of the retail unit, for example, may have total access and control over their accounts and/or transactions unlike customers of a treasury retail unit. Indeed, in many instances, the person placing the service request is a representative of the customer, which may be a corporation. He or she may only have access to the certain company account(s), may only be authorized to conduct certain types of transactions or submit certain types of service requests. For these reasons, customer interaction may differ not only from customer to customer but also from application to application.

Furthermore, the interaction at each application may differ from time to time. The system may be configured to interact based on the information currently available. Thus, the system's interaction actions may change as additional information is received or existing information is updated. Similarly, interaction may change as system and/or interaction policies change over time. In at least one embodiment, the interaction may dynamically change during a session with a customer.

In one embodiment, the interaction provided by one or more applications 304-312 or the interaction engine 200 with a customer may be determined, at least in part, by the service level agreement(s) with the particular requester or customer. Customers may be provided with more or less capability depending on the service level agreement(s) between the financial institution and the customer, or in some cases, the representative of the customer. Similarly, the interaction with the customer may also be affected by the customer preferences, as previously defined by the customer or by the customer interaction history. Examples of differences in interaction based on SLA, customer preferences or interaction history may include the tone of the questions (e.g., more apologetic, more patient, etc.), the questions asked, the estimates provided with respect to service request completion, the number or type of credentials requested, the amount of information provided in response, the actions allowed, and even the gender or attributes of the representing device that interacts with the customer (e.g., voice, name, etc.).

Indeed, any existing applications of a financial institution may be modified and incorporated into the present invention to operate as an application of applications 304-312. Thus, it should be readily apparent to one of ordinary skill in the art that existing applications may be modified to forward information received from the customer automatically. Furthermore, existing applications may be modified such that the application is controllable by the central interaction controller 316 and to receive and operate according to interaction policies received from the central interaction policy controller 316 and/or central interaction policy store 320. Furthermore, existing applications may be modified to allow remote configuration by a central administrator.

Figure 3B:
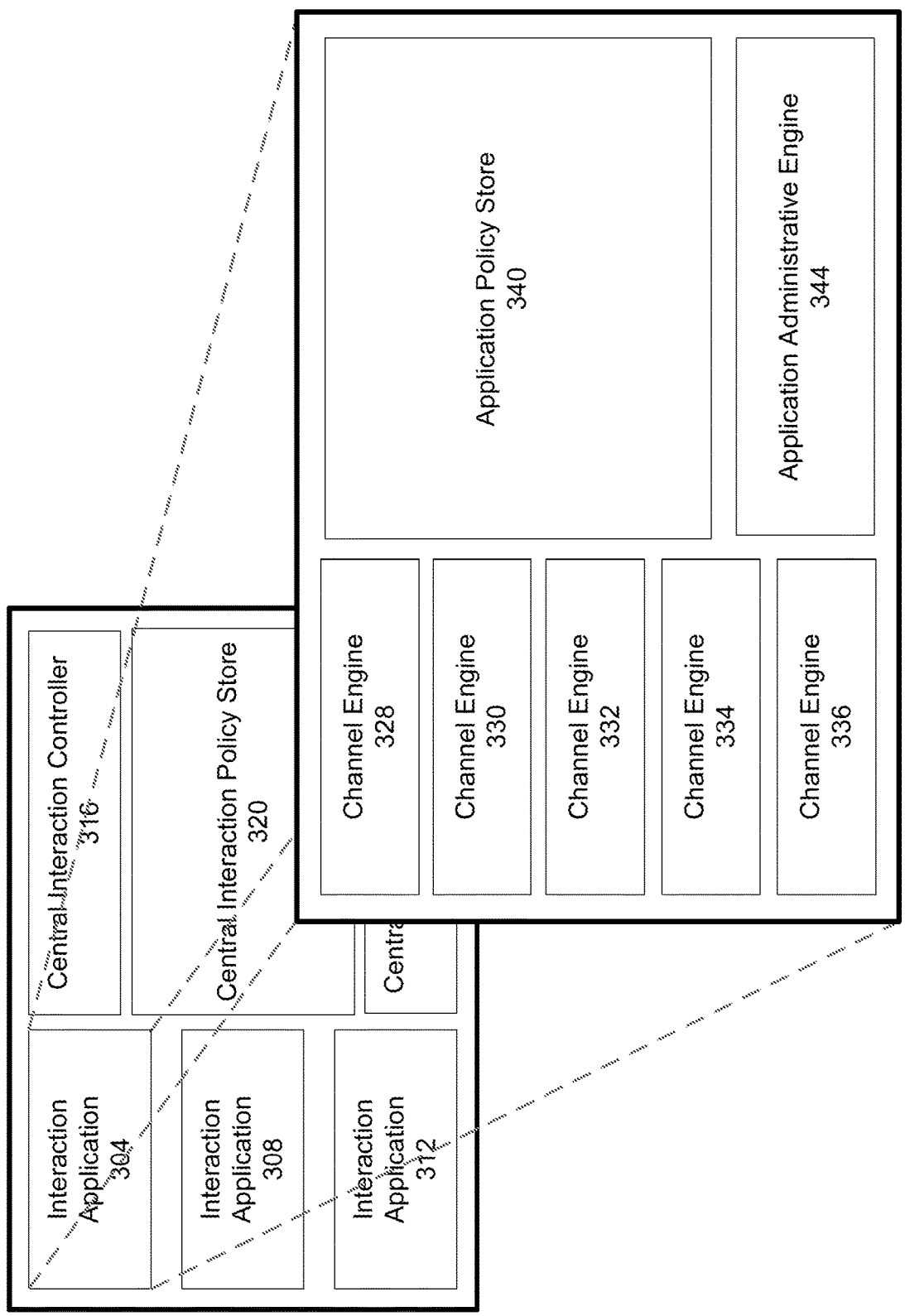

Each of the applications 304-312 may be capable of processing customer requests over a number of channels. FIG. 3B depicts a block diagram of an application in accordance with an embodiment of the present invention, comprising a plurality of channel engines 328-336, an application policy store 340 and an application administrative engine 344. Thus, individual business units may configure an application and may configure how each of the channel engines 328-336 may operate. Indeed, each of the channel engines 328-336 may operate in similar fashion as the channel engines 204-220 described with respect to FIG. 2. Furthermore, each business unit may configure the application policy store 340 in similar fashion as the policy store 224, defining how the various channel engines 328-336 may interact with a customer over one or more channels, such as by defining an interaction tree and configuring what questions are asked and what answers are given. Similarly, the application administrative engine 344 allows an administrator of the business unit to perform administrative operations.

The interaction engine 300's central interaction controller 316 may receive customer requests from each of the applications 304-312, process the requests received from the applications 304-312 and forward the processed requests to the resolution engine. The central interaction controller 316 may receive the request information from the applications and modify or generate customer requests accordingly. For example, the central interaction controller 316 may convert data received from an interaction application 304 in the form of a proprietary data file and may convert it to a XML data file that, when received by the resolution engine, may be readily processed. As another example, the central interaction controller may receive from interaction application 308 an email describing the details of the customer request. It may filter the email message to detect the various request information details (e.g., service request type, customer account number, customer name, customer PIN, etc.) and generate an XML file containing the service request information.

In at least one embodiment, the central interaction policy store 320 may contain policies dictating customer interaction operations of each application and in at least one embodiment, may contain policies dictating how each of the channel engines of interaction applications 304-312 operate.

The policies at the central interaction policy store 320 may have priority over policies at application policy stores (e.g., application policy store 340). Thus, an application policy may be utilized in one instance (e.g., for a particular type of customer, particular channel, with certain system conditions, or at a particular time of day), and a policy at the central interaction policy store 320 may be utilized in another instance. Thus, this feature allows a central administrator to control how customer interactions take place at an instance and allow the individual applications to operate according to the desires of the business units in another instance. For example, the central interaction policy store 320 may contain a high-priority interaction policy whereby during IVR (telephone) customer interaction, the customer's last four digit of his or her social security number must be collected. Thus, even when a retail business unit controls an interaction application 336 with a conflicting policy (i.e., only the customer's account number and name is collected over the phone), the application 336, during operation, may control its telephone-based channel engine to ask the customer for his or her social security number. Using the central administrative engine 324, an administrator may customize customer interaction operations at the applications and channels in any manner and customize under what conditions the interaction policies at the central interaction policy store 320 may have priority over the application policies. The central administrative engine 324 further allows an administrator to customize the operations of the central interaction controller 316, such as what service requests are transmitted to the resolution engine, which applications to accept customer requests from, and how the customer requests received from a particular interaction application may be interpreted and converted.

The interaction engine may further include a servicing detection unit (not depicted) that may automatically detect system and channel conditions in which a servicing is necessary. The servicing detection unit may communicate with one or more devices over any of the channels available and determine that a service request needs to be generated because an issue has arisen that requires resolution. For example, the servicing detection unit may communicate with an ATM and determine that a deposit submitted by a customer was not processed properly. It may automatically generate a service request similar to a request that would be received from a customer regarding the same issue. However, the service detection unit detects the need for a service request quickly and efficiently and in most cases before the customer may even realize there has been an issue with his or her deposit that requires adjustments. The service detection unit, in this example, may automatically communicate with the ATM over the ATM channel to retrieve as much information as possible from the ATM regarding the transaction in question. Thus, the servicing detection unit may retrieve the customer's account number, the check number, a picture of the check as submitted at the ATM, and the amount deposited. Similar service requests may automatically be generated as a result of irregularities or problems detected by the interaction engine from transactions through a branch office, the online banking website, a teller, mobile device, external financial institutions and others.

The servicing detection unit may also create service requests that are not triggered by a particular customer event. Rather, it may be configured to check on customer accounts from time-to-time for irregularities or inactivates that may require service requests. For example, the servicing detection unit may automatically generate a service request to ask for the status of a credit card application after 30 days has elapsed since the submission of the application. Upon resolution, the customer may automatically be notified of the status of the application, even though he or she did not ask for an update. Similarly, the servicing detection unit may make sure that all addresses information is up to date and if not, may create a service request to update the address or contact information of a customer according to recent address information.

In some embodiments of the interaction engine, the engine further comprises a customer interaction storage (not depicted) that may store recent results and history of service requests. The customer interaction storage may store recent customer service requests, results and customer information that have been prefetched by the resolution engine. In one embodiment, the customer interaction storage may store such requests for a definable time period, such as 30 days, thereby acting as a data cache and allowing the interaction engine 300 to quickly gather customer information.

The customer interaction storage may further allow the interaction engine to quickly determine the type and scope of the customer request. Thus, the interaction engine may refer to the customer interaction storage during interaction with the customer in order to facilitate the determination of the type and scope of the customer service request. For example, a customer service request may more likely be related to the customer's debit account because the customer submitted a service request for that account in the last 24 hours. Similarly, if a customer recently submitted a credit card application service request, it may be more likely that the request is related to the status of the customer request. Thus, the interaction engine may cause the following question to be asked early on in the interaction: "Is this service request related to your recently submitted credit card application serial number 125521?" In one embodiment, different interaction policies or different points in an interaction tree may be used based on recent service request information stored at the customer interaction storage.

It should be readily apparent that, in some embodiments of the present invention, the interaction engine may contain only some the components and/or engines described herein. In at least one embodiment, various existing applications of financial institutions may be modified to forward service requests received therein directly to the resolution engine. Thus, in such embodiments, the fulfillment system may comprise one or more applications connected to a plurality of channels. Each application is connected to the resolution engine. The service requests received at the resolution engine may be in any data format (e.g., word document, XML form) or may be in one standard format, in which case, each application may be modified to convert the service request data to the standard format. Thus, the present invention is a flexible solution that may be configured into any number of arrangements.

Resolution Engine

Figure 4:
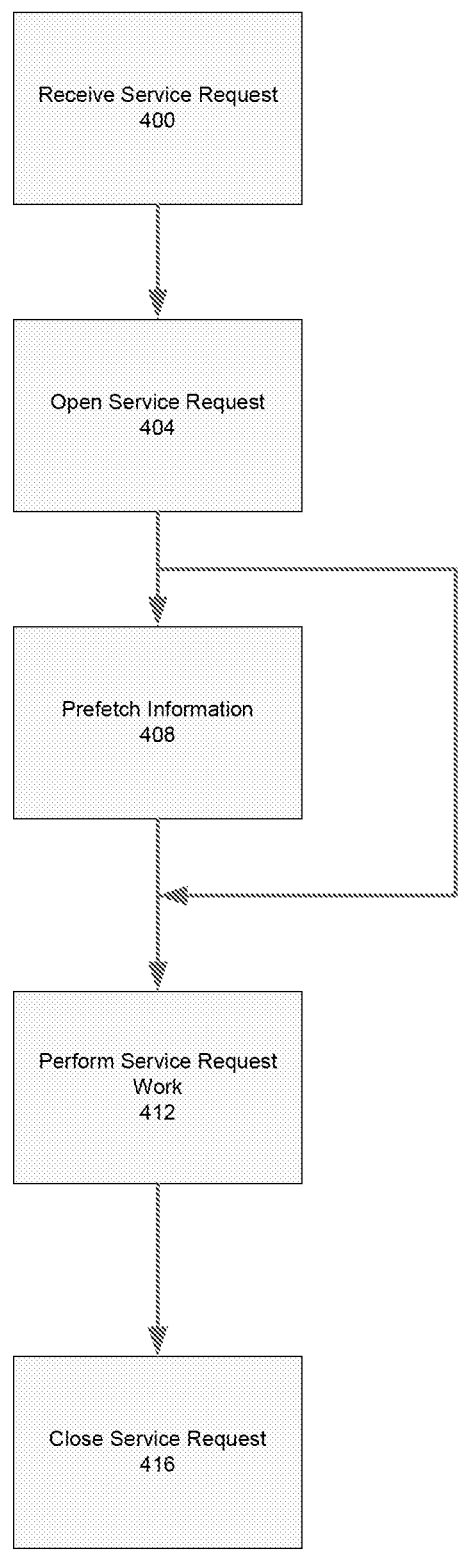
FIG. 4 is a flow chart illustrating an exemplary method performed by the resolution engine in accordance with a preferred embodiment of the invention.

The resolution engine fulfills customer requests according to the service request information received from the interaction engine. FIG. 4 illustrates a simple flow chart of operations at the resolution engine in accordance with an embodiment of the invention. At 400, information describing the service request is received from the interaction engine. As seen above, the interaction engine operates as an intermediary between the channels (and customer) and the resolution engine, interacting with the customer to receive and translate the customer request to a form that may be processed by the resolution engine. Thus, in the preferred embodiment, the service request received from the interaction engine may be in a standard format, independent of the channel and application from which the request may have been received. This allows the resolution engine to resolve service requests in a standardized manner independent from the original request form or source. In addition to information detailing the request, such as the account and transaction information, the service request received may further contain associated documents that have been scanned and converted into a digital format.

At 404, the resolution engine opens a service request, corresponding to service request information received. In the preferred embodiment, the resolution engine automatically opens a service request in response to receiving the customer request information. Indeed, the resolution engine may track the status of every service request. Status of a service request may include open, pending, hold, working, exception, closed, and/or others. Accordingly, the resolution engine has the capability to track statuses of all service requests at any given moment, allowing customers to request the status of his or her service request at any given moment through any of the plurality of channels. This further allows associates to determine and retrieve a list of all service requests having a particular status. In at least one embodiment, the service resolution engine may also open a new service request in response to received communications and/or documents such as new support documents. Once processed, the document may be automatically associated with a particular account, transaction, or service request such that the document may be automatically prefetched in connection with a service request. Indeed, in various embodiments, this feature is not limited to documents (digital or print) but may also include voicemails, pictures, and other media.

At 408, the resolution engine determines and collects all information that may be necessary to fulfill the service request, taking into consideration the request type, transactional and profile information, preferences, service level agreement(s), business unit requirements, regulatory guidelines, history and system policies and other information. The resolution engine prefetches such information from various business unit systems, and in particular, from the databases at such business unit systems.

At 412, the resolution engine performs operations to resolve the service request, which is also referred to as the "work" stage. As discussed in further detail, the resolution engine may perform the operations automatically or may facilitate and aid an associate in resolving the customer request.

At 416, the resolution engine closes the service request order within the system, changing the status of the service request to "close." It may return the results of the operations at 408 at 412 to the interaction engine so that the result may be communicated to the customer, if applicable.

Figure 5:
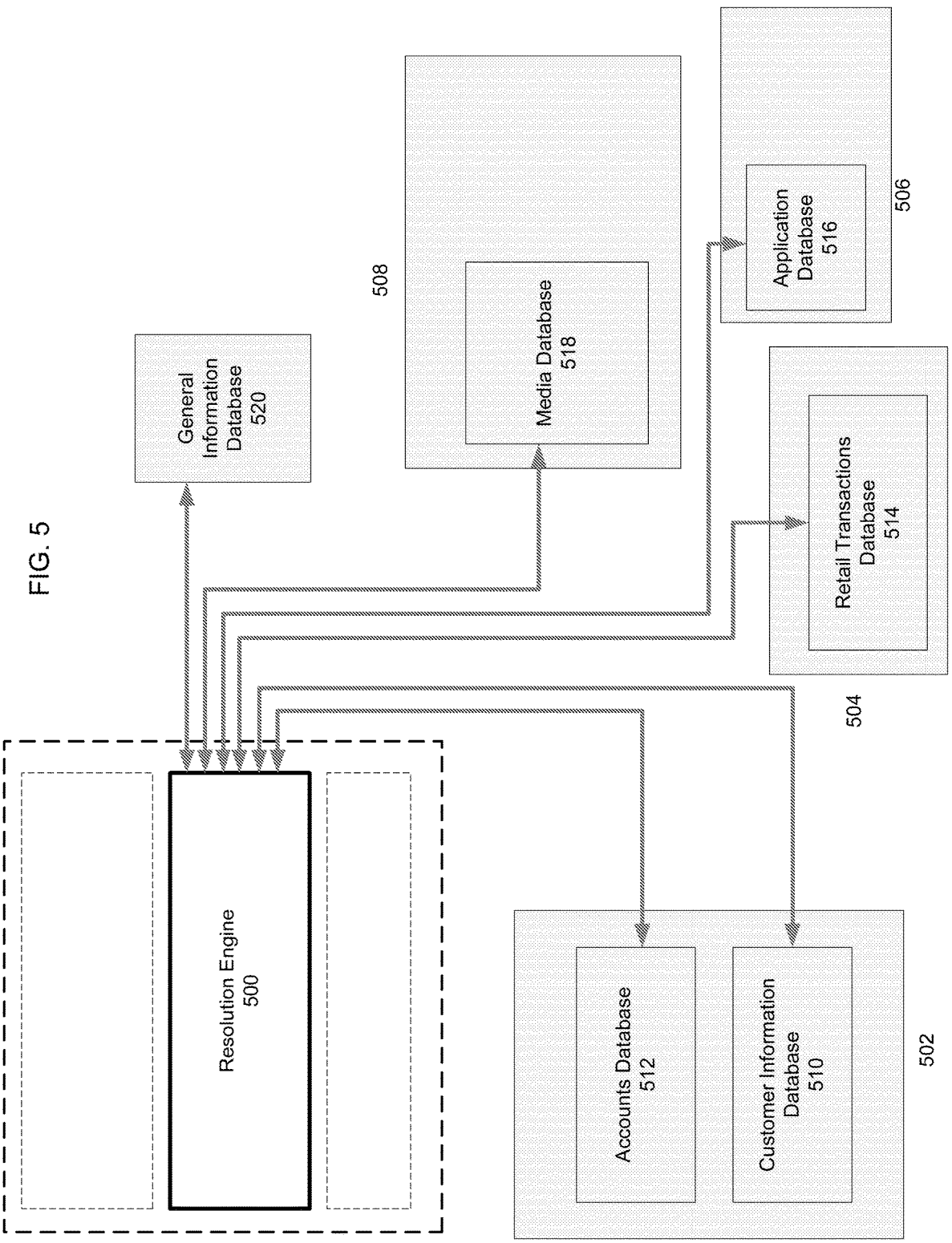
FIG. 5 is a block diagram illustrating a fulfillment system comprising a resolution engine and its communication channels with a plurality of business unit systems in accordance with an embodiment of the invention.

FIG. 5 is a block diagram illustrating an embodiment of the fulfillment system. As seen in this illustration, the resolution engine 500 may be connected and have access to various databases, such as customer information database 510, accounts database 512, transactions database 514, application database 516, media database 518, and general information database 520. Such databases may be contained and managed by a business unit system such as databases 510, 512, 514, 516 and 518 or may be a standalone database that is not associated with a business unit system, such as database 520. Thus, through its connection with the databases, the resolution engine 500 may have access to a variety of information, such as customer account information (e.g., debit, credit card, 410K, mortgage, and types of accounts), detailed transactional information (e.g., deposits, withdrawals, postings, interest rates, account and channel specific actions, withdrawn/posted accounts), application information for various account types (e.g., status, results), preferences (e.g., alert, monthly statement delivery settings, paperless, prioritized contact preferences), general account information (e.g., primary address, primary bank address), service and contact history, recent collection related actions (e.g., collection letters or items) and other types of information that may be stored at a business unit of a financial institution or generally stored at the financial institution. It should be readily apparent that the types of information available to the resolution engine 500 may depend on the business units of a financial institution and the information each of the business units may store. Thus, the resolution engine 500 may have access to information uniquely stored by the financial institution's business unit systems, such as the systems of the business unit in charge of retails services, ATM services, adjustment services, reconcilement services, and application services.

In several embodiments of the present invention, the resolution engine 500 not only prefetches information from databases and systems within or related to the system(s) of the financial institution, but may further prefetch information from various external sources, including regulating agencies, social networks, and news sources. For example, customer information may be retrieved from Facebook or Twitter accounts of the customer or other individuals, which may be used by the system in processing the customer's requests. GPS information, for instance, may be gathered to process a fraud-related service request. Such information may also be utilized by the system to provide the customer with an updated status of his or her service request(s), such as through the messaging capabilities at one of these external sources.

In at least one embodiment, rather than directly accessing and manipulating the data at the databases, the resolution engine 500 may cause the business unit systems and/or other systems with control over the databases to perform the inquiry itself and to deliver the information to the resolution engine once it has been retrieved.

Figure 6A:
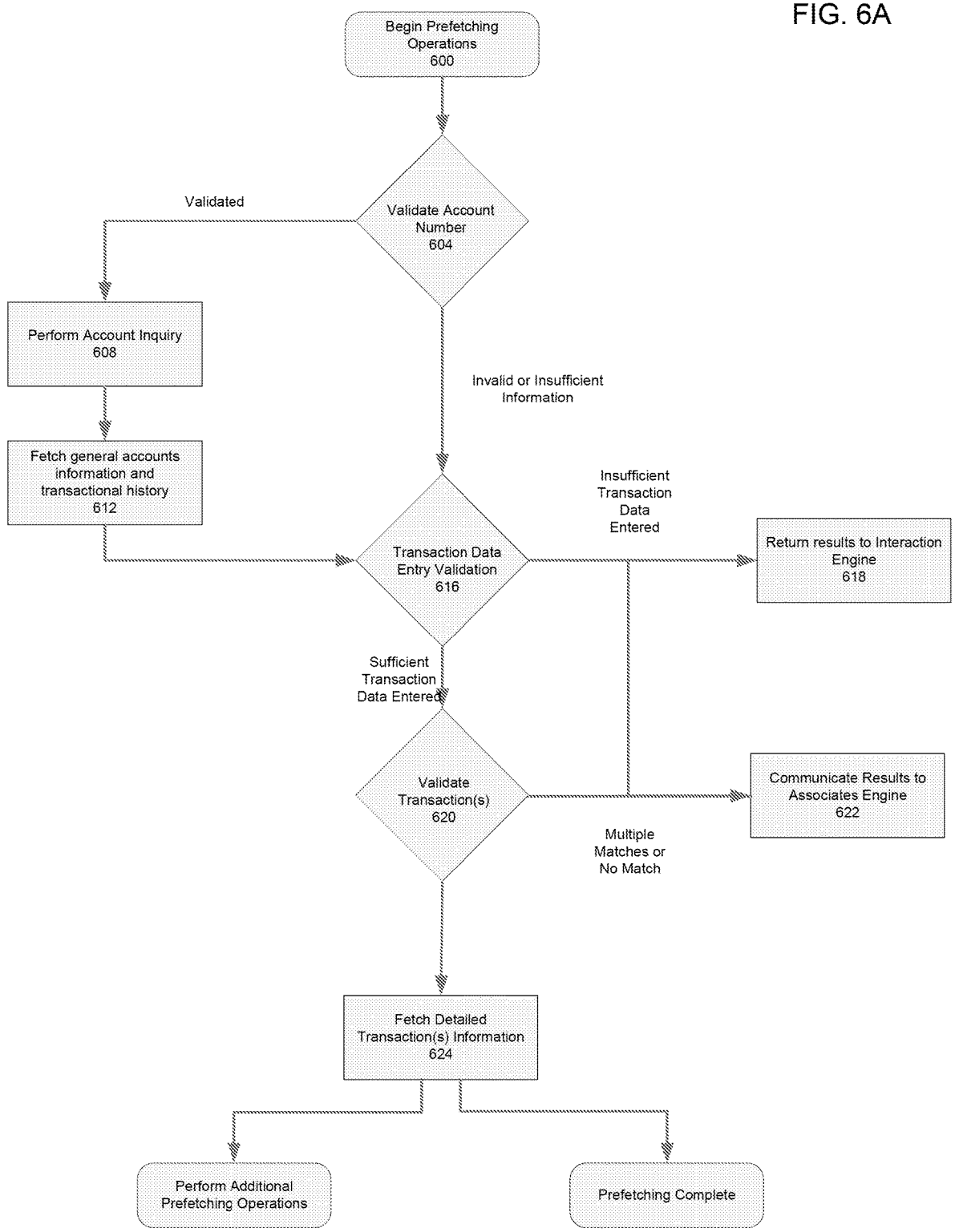
FIGS. 6A-6B are flow charts illustrating exemplary prefetching methods in accordance with a preferred embodiment of the invention.
Figure 6B:
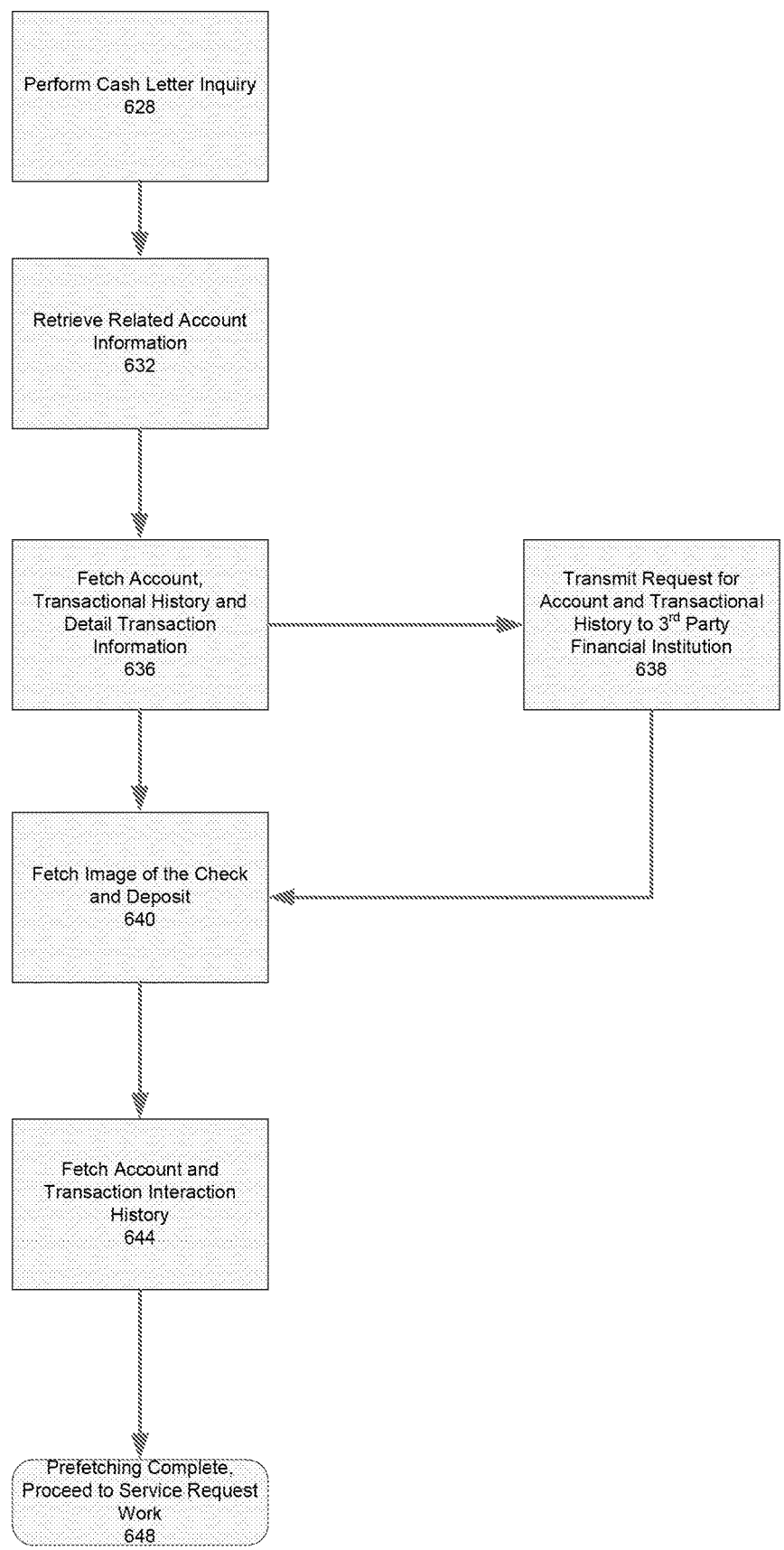

To determine the particular information that may be necessary to fulfill a particular customer request, the resolution engine dynamically analyzes the information received from the interaction engine. FIG. 6A depicts an exemplary flowchart of prefetching operations performed by the resolution engine. For illustrative purposes, the flowchart of FIGS. 6A and 6B are taken by the resolution engine in response to opening a service request requesting readjustment of the amount entered into an account after a deposit of a check. For example, a customer may contact the financial institution because he deposited a check for $100. However, the amount posted to his account by the bank was only $10. In this running example, he seeks to have the remaining $90 posted into his account.

At 604, the resolution engine validates an account number provided by the customer. If the account number and information is validated for a particular account, the interaction engine may proceed to 608 where it performs an account inquiry and, if necessary, gathers the transactional history of the account. At 612, the resolution engine may fetch general accounts information and a transactional history from the accounts database 512 (FIG. 5). The service resolution may further gather customer preferences for the account from the customer information database 510, which may dictate what additional operations are performed, what information is provided to the customer in response, and how an associate may interact with the customer. If at 604, it is determined that the customer-provided account number was not valid or if the customer did not provide an account number, the interaction engine may proceed to 616 where particular transaction information provided by the customer may be searched. This operation may also be performed after the account is validated at 612.

At 616, utilizing the information received from the customer from the interaction engine during the initial inquiry, the resolution engine determines whether the customer has provided sufficient information necessary to identify a particular transaction, which may include a transaction's transaction date, listed/request amount, sequence number, drawee account number, check number, bundle total, and others. In the preferred embodiment, at least three of the transactional data types must be provided by the customer in order for the resolution engine to find and validate a transaction. In one embodiment, more information may be required for customers that have not validated their account information (e.g., the interaction engine moving from 604 directly to 616). If sufficient information has been provided to perform a validation, the resolution engine proceeds to 620, where it determines whether there is a match based on the information provided. If there is a single match, the resolution engine proceeds to 624, where it may fetch detailed transactions information of the transactions database 512. It may further fetch information of the account prior to and after the transaction in question from the accounts database 510. If there are multiple matches or no matches at 620, or if there is insufficient transaction data at 616, the interaction engine may return the results to the interaction engine at 618 or communicate the results to the associates engine at 622 according to configuration of the interaction engine, which may further depend on the service request type, source, or system conditions.

FIG. 6A thus depicts at least a portion of the inquiries that are performed by the resolution engine in prefetching information necessary to resolve the customer request. Indeed, in one preferred embodiment, the method depicted in FIG. 6A are the initial operations taken by the resolution engine with respect to a majority of service requests opened. It should be readily apparent that different actions may be taken in other embodiments, and may vary depending on the service request type.

Additional inquiries may be made by the resolution engine and additional data may be gathered during prefetching. The resolution engine may utilize not only the information received from the interaction engine (i.e., information received from the customer), but may also utilize the account and transactional information fetched (e.g., information fetched at 612 and 624) to perform further inquiry and collect additional information.

In at least one embodiment, the inquiry made and information retrieved may be based, at least in part, on the SLA(s), customer preferences, interaction history, or other information. Additional authentication may be required based on the SLA. For example, additional authentication inquiries may be necessary when a representative of the customer (e.g., a company) requests actions to be taken that may require higher-level authorization than the representative may have otherwise. Similarly, less information may be prefetched (and provided to the customer) by the resolution engine because the representative that is requesting a service request may only be authorized to view or have access to a portion of the account(s) or transaction(s) according to the SLA or customer preferences. As another example of the broad capabilities of this resolution engine, the resolution engine may further prefetch additional information based on the SLA, customer preferences, or interaction history. For instance, where the customer is associated with a higher-level account (e.g., executive accounts or high credit accounts), more information may be prefetched so as to more timely and efficiently satisfy the customer's current requests as well as additional foreseeable requests. Thus, more information may be prefetched for customers that the financial institution may consider to be of a higher-profile or more importance, so as to avoid dissatisfying the customer. Thus, in several embodiments of the present invention, the fulfillment system dynamically evaluates the customer's potential or existing frustration level and acts accordingly.

Similarly, more information may be prefetched for customers that had several recent service requests or interactions with the financial institution due to repeated issues with his or her accounts, such as customers that may be disgruntled. The resolution engine may be programmed not only to expand the scope of information that is retrieved but similarly to expand the scope of inquiries, thus allowing additional information to be retrieved or for actions to be taken more efficiently. For example, pre-authorization may be requested in advance of request resolution or requests may be resolved automatically without associate approval.

FIG. 6B depicts additional operations that may be taken by the resolution engine. At 628, a cash letter query may be executed by the resolution engine wherein the cash letter containing the transaction in question may be retrieved from the general information database 520. The information of the transaction as provided in the cash letter to the Federal Reserve may be fetched at this point. At 632, the related account (e.g., drawee or sender) information with respect to the transaction in question may be fetched if such information is available from the cash letter inquiry. At 636, the account information and transactional information may be retrieved with respect to the related account. If the account is also an account that is maintained by the financial institution, the resolution engine may simply fetch the account information, the transactional history and the detailed transaction information from the account information database 510 and transactions database 512. If another financial institution maintains the account, the resolution engine may cause the transmittal of an account and transaction information request to the financial institution at 638. In one embodiment, the resolution engine may proceed to 640 without waiting for an answer from the financial institution system. At 640, the resolution engine may retrieve an image of the check and an image of the deposit receipt provided to the customer from the media database 516. At 644, the resolution engine may retrieve information describing all recent actions taken with respect to the account and/or all actions with respect to the particular transaction in question. Such information may include any branch teller work, account maintenance, service request history, and others. At 648, the resolution engine terminates the prefetching phase and proceeds to resolve the service request (i.e., "work" the service request).

The flowchart of FIGS. 6A and 6B depicting prefetching operations at the resolution engine is for illustrative purposes only. It should be readily apparent to one of ordinary skill in the art that additional operations or a subset of the operations described may be performed by the resolution engine in response to the same or similar service requests to readjust transaction and account records. Furthermore, while some of the inquiries and fetching of data are depicted as being performed sequentially, they may also be performed concurrently with one another where possible. For example, operations at 636, 640 and 644 may be performed at the same time by the resolution engine, allowing prefetching operations to be performed in a timely and efficient manner.

The resolution engine may perform other prefetching operations related to a service request. For example, the resolution engine may prefetch copies of account applications and the status and details of the application process in response to a request for an application status. Similar operations may be performed in response to a service request concerning savings bond processing. In response to an ATM service request, such as unreadable or mistaken reading of a check deposit at an ATM, the resolution engine may prefetch service, maintenance and transactional history of the ATM in question. The resolution engine prefetches various information in response to various forms of electronic fund transfers issues such as those problems with automated teller machine transfers, telephone bill-payment services, point-of-sale (POS) terminal transfers in stores, and preauthorized transfers from or to an account. Similarly, the resolution engine may prefetch information necessary in resolving disputes related to regulation E (i.e., 12 C.F.R. § 204), UCC disputes, debit card unpostings, and other retail claim disputes. Other types of information prefetched may relate to loans and products of a financial institution. Indeed, the resolution engine further has the capability to prefetch information in response to general information requests from internal requestors (e.g., general request for contact history, transaction history, phone/email, line of business portals, and correspondence). Likewise, the resolution engine may prefetch general information for customers (e.g., requests for correspondence records and statements). Furthermore, the resolution engine may retrieve standardized advice from a standard advice database, in response to common requests for advice or for technical issues. As discussed in other portions of this disclosure, the type and amount of information retrieved may be partly dictated by customer service level agreements, customer preferences, customer interaction, and service history, and various other information or conditions.

The resolution engine, in certain embodiments, further has the capability to contact a business unit and associates to gather additional information that the associate may be able to provide with respect to the service request. For example, the resolution engine may contact the agent in charge of a mortgage application. In one embodiment, the resolution engine may cause a message (e.g., automated voice message or email) to be generated and communicated to the application associate, allowing the associate to respond directly to the service resolution. For example, a call may be placed to the associate and the associate may respond over the phone or other channels. The resolution engine may provide the associate at the work stage with access to the voice response or a transcript of the response message. Similarly, the resolution engine may automatically generate a letter or populate a request form used by the particular business unit with the necessary information and transmit the letter to the business unit and its associates. The resolution engine may further receive answering forms, scan the form and detect the current status of the application by recognizing texts in the form. In response, it may update the status of the service requests, provide the customer with an answer and close the service request. Similar operations may be taken in communication with other types of requests and with other financial institutions, regulating agencies, and other internal and external contacts.

The prefetching capabilities of the resolution engine may further include the ability to prefetch authorization for actions that would be taken in resolving the service request. For example, in order to adjust a check deposit positing, reconcilement operations may need to be taken to request the remaining amount to be transferred to the account (e.g., the remaining $90 dollars that would be posted). Thus, the resolution engine, in communicating with at least one business unit system, may request preauthorization to transfer the reconcilement amount from the payor's account to the payee's account. The resolution engine may transmit the authorization request information to a reconcilement business unit system of the financial institution, causing the reconcilement business unit to request the authorization with the other financial institution (if applicable), for example. In certain circumstances, the resolution engine may further prefetch authorization from a manager of a business unit and the like, consistent with authorization procedures well known in the art. By prefetching authorization for the transfer of the reconcilement amount, the customer may be able receive a confirmation of service request resolution much sooner. In one embodiment, the resolution engine may proceed to fetch other information and even advance to the "work" stage. Efficiency may be gained as authorization may already be confirmed if and when an associate authorizes the reconcilement operations during the "work" stage.

In cases in which prefetching has failed, manual information retrieval of information may be required. Prefetching may fail for a variety of reasons including, when the prefetching system is down, when the account or transaction information was not found, when there are multiple results found for a particular transaction or account, or when there are signs of fraud within the account. In at least one embodiment, if prefetching fails, the results may be provided to the interaction engine and the customer may be asked to confirm the information or to provide additional information.

Returning now to FIG. 4, after prefetching operations are complete, the resolution engine, at 412, processes the service request using the information prefetched (i.e., the "work" stage). As seen in FIG. 4, in certain circumstances, the resolution engine does not perform prefetching but rather, processes the service request directly when received. For example, when a collection letter or item is received, no service request record may be opened and no prefetching is performed. Similarly, PRT responses and support documentations received may not require prefetching of information. Other types of service requests systems may similarly not require the prefetching of information, including those that simply require the updating of customer, transaction, application and other types of information and records.

Figure 7:
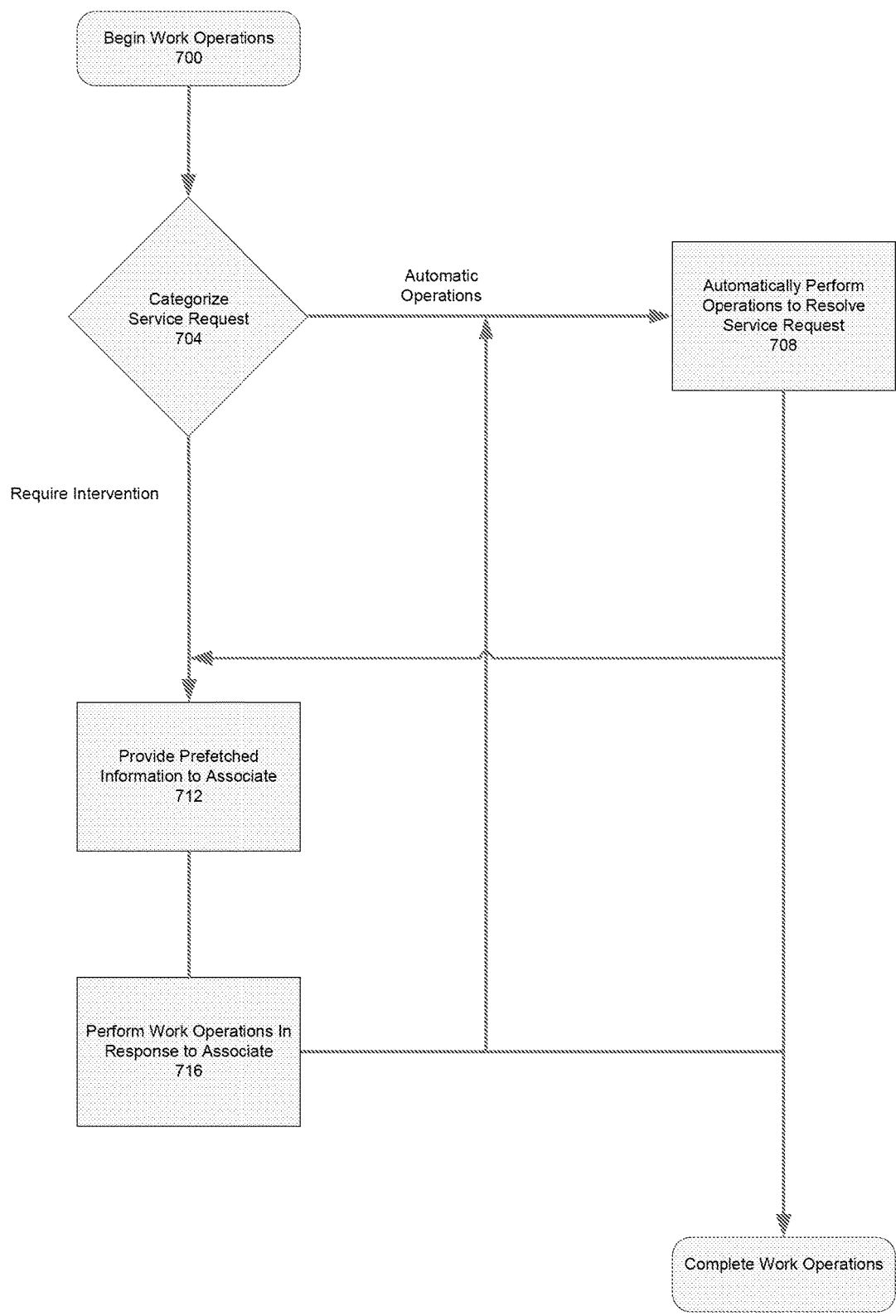
FIG. 7 is a flow chart illustrating an exemplary request work method in accordance with a preferred embodiment of the invention.

FIG. 7 depicts an exemplary flowchart depicting work operations performed by the resolution engine in accordance with an embodiment of the present invention. The resolution engine may operate differently in processing the service request depending on the type of service request received. In the preferred embodiment, service requests may be categorized into two types: service requests that may be processed automatically and those that require associate processing or at least require associate approval. In at least one embodiment, there may be a third category for high-valued service requests (e.g., transactions with value greater than $250,000). Such actions may require approval of not only the associate but also may be escalated for approval by a manager or executive of a business unit and may require such approval before any processing ("work") may be performed by the resolution engine. At 704, the resolution engine categorizes the service request within one of the two types of service requests. Note that in some circumstances, service requests may be partially processed automatically but still require approval, at least in part, to complete. In at least one embodiment, service requests may be categorized based on general accounting practices.

The categorization may also be determined based on configurable rules. Such rules may be configured to categorize the types of service requests based on not only the service request types, but also the channel over which the service request was received. Thus, a service request received via text may require approval from an associate whereas the same type of request, when communicated through a teller may not require approval and may be processed automatically. In at least one embodiment, the resolution engine's service request categorization rules may prioritize the service requests based on likelihood of risks and accuracy of entry. It may factor such information in conjunction with the type of service request, balancing financial risk with system efficiency in determining whether the service request may be processed automatically.

In at least one embodiment, the categorizing of a request for processing may be dependent on the SLA(s) between the customer and the financial institution, the customer preferences and/or the customer's service or interaction history. For example, a service request for a relatively small amount of money may be processed automatically for higher-profile or certain types of accounts (e.g., large corporate accounts), whereas the same service request concerning the same amount of money may require approval for a retail account. Similarly, a service request may be processed automatically where the customer has had several issues or service requests in the last 24-72 hours, for instance. Furthermore, customers, such as account holders, may further define, through their customer preferences, whether a service request may be automatically processed or must be approved. Account holders, for example, may define not only the types of requests that are subject to automatic or approval-required processing, but also the amount requested, the location, the authorization level of the particular requester, and various other aspects or attributes of a request well known in the art.

The resolution engine may process service requests based on SLA requirements or system settings. Thus, the system may allow for more service requests to be processed automatically when, on average, the defined average processing time is higher than what is provided in one or more SLAs. Thus, the system may automatically allow deposit adjustment requests to be processed automatically because on average, the amount of time to process a service request (e.g., from initial creation to closing) is higher than what is defined by an SLA between a customer and the financial institution or is higher than as defined by system-wide preferences. The SLA(s) or system-wide defined preferences may define average or maximum amount of time that may be taken to process a customer request based on the type of request, account, transaction, or various other attributes or conditions.

As seen, in several embodiments of the present invention, the service resolution engine has the capability to dynamically determine, on a request-by-request basis, whether approval/manual action is required.

Service requests that may be processed automatically by the resolution engine include those that contain simple administrative actions to be taken, such as requests to modify customer account information, alert delivery settings, and general customer preferences. Requests for information such as requests for the status of an application, account balance, status of a deposit, copies of media (e.g., image copies of checks), delivery of correspondence and statements, servicing of non-conforming images, and providing of contact and transaction history, may also be automatically processed. This category of service requests may also include service requests that contain minimum financial risks to the customer or the bank, such as those requests for adjustment of amounts posted for less than $200 due to misreads, unreadability or other related claims.

In contrast, service requests that require intervention may include those that require manual actions by an associate or may require approval before an action may be completed. For example, service requests may require the associate to compile documents for filing with an agency; draft and send collection letters; request approval from a manager; communicate with other financial institutions or regulating agencies; get explicit approval or confirmation from the customer over the phone (or other channels); print hardcopies of forms and send to internal or external destinations; and others. Furthermore, service requests may require an associate to approve a service request because of financial risks, because such requests are prone for fraudulent activities, because the requests are complex, because the service request can easily result in erroneous entries, or because associate authorization is required internally or by law.

Service requests may also require intervention by an associate based on the user's preferences. Thus, a user may configure his or her account to require an associate to intervene before completing a request. Such preferences may be defined based on the type of service request, channel, location, time, or any other customizable variables. Such preferences may be utilized by a parent or an account owner, for example, to prevent a child or other associated account holders from submitting service requests without authorization. In these embodiments, the prefetching of customer preferences is especially beneficial.

If the service request may be automatically processed, the resolution engine proceeds to 708 wherein the operations necessary to complete the service requests are completed automatically. The resolution engine may communicate with one or more business units to effectuate one or more actions. Thus, the resolution engine may generate and communicate actions that should be taken by the business unit systems. For example, in response to a request to fix a deposit error wherein only $10 was posted to an account for a $100 check, the resolution engine may communicate with one business unit system to request the transfer of $90 from the payor's debit account from another financial institution, communicate with another business unit to adjust the payee's debit account with $90 more dollars, communicate with a third business unit to report the adjustments request to a regulating agency and communicate with yet another business unit to log the expectation of a $90 transfer from the financial institution and that $90 has been credited to the payee's account. The request for action by the business unit systems may be placed in one or more queues at the business unit systems for processing. Other methods may be used that are well known in the art. In certain circumstances and in some embodiments, the resolution engine may have direct access to and may directly modify relevant databases data entries at the business unit systems. This may decrease delay and increase efficiency.

It should be readily apparent that in some situations, exceptions may be raised during the resolution engine's automatic processing that then may require associate intervention for completion. Thus, as seen in FIG. 7, after some operations have been completed automatically by the service resolution engine, it may proceed to 712 for intervention by an associate. Furthermore, upon intervention by an associate, the resolution engine may proceed back to 708 for further automatic operations, and so on. Upon completion of the service request, the resolution engine may complete the work stage. It may proceed to 416 (FIG. 4) whereat the resolution engine updates the status of the service request as closed.

Service requests that require associate intervention or approval are processed at 712 and 716. In particular, the resolution engine may provide the prefetched information to the associates. The resolution engine may communicate the prefetched and service request information to the associates engine for display to the associate responsible for handling the service request. The associate may view the information prefetched, determine the operations necessary to complete the service request, and perform the service request operations. An associate may further also cause more information to be prefetched, escalate a service request for operation approval and communicate with the customer to gather more information.

In at least one embodiment, the resolution engine may also generate one or more suggested operations, reminders and notes for review by the associate. The associate may utilize such information as a guide in processing the customer request. The resolution engine may be configured to allow an associate to simply approve the suggested actions. As one example, in response to a request to reconcile a savings bond amount difference, the associate may access a website containing a savings bond utility, cause the re-pricing of the bond based on the interest rates, cause the generation of a 1098/99 correction form for the customer, print the form for processing and forward the information for financial adjustments accordingly.

Returning now to FIG. 4, when the actions necessary to resolve a service request have been performed, the resolution engine proceeds to 416. The service resolution may update the status of the particular transaction to be closed by recording the actions and results of the service request processing. The resolution engine may then communicate the results of the service request which may relay the results to the customer over the same channel from which the service request was received. In at least one embodiment, the interaction engine may communicate the information over another channel as set by customer preferences fetched by and communicated from the resolution engine. Other information may be provided including the actions that were taken and a confirmation receipt. In at least one embodiment, the resolution engine also communicates all prefetched information to the interaction engine 400 for storage at its customer interaction storage described in other portions of this disclosure.

The resolution engine may also cache the service request and prefetched information. It may store such information for a period of time before deletion or transfer it to a service request history database for quick retrieval of the information in response to subsequent service requests. For example, in one embodiment of the present invention, the customer may approve or cancel the actions that were taken by the resolution engine and may submit additional or modified service requests in response.

Figure 8:
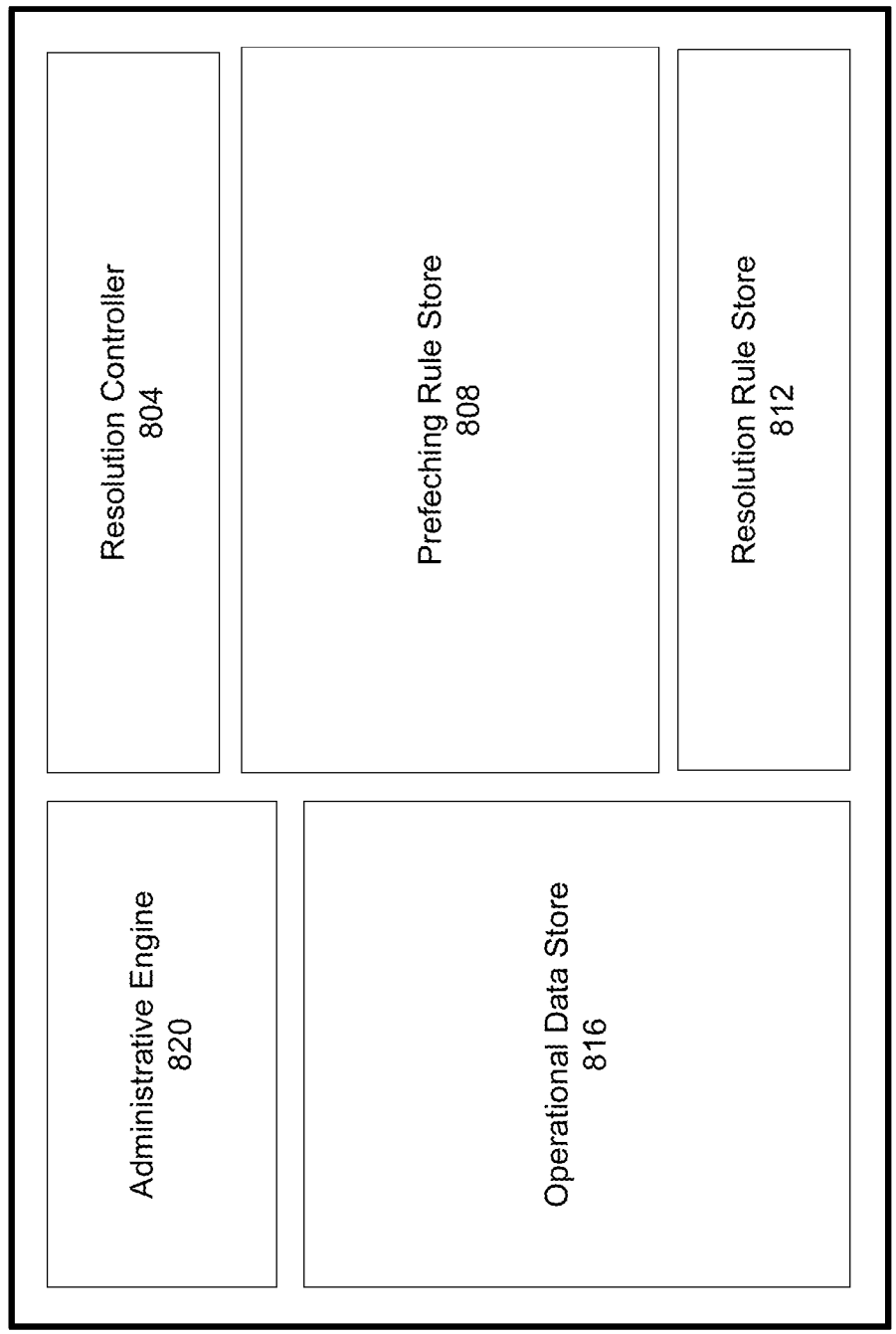
FIG. 8 is a block diagram illustrating the associates engine in accordance with an embodiment of the invention.

FIG. 8 depicts a resolution engine in accordance with an embodiment of the present invention, comprising a resolution controller 804, prefetching rule store 808, resolution rule store 812, an operational data store 816, and an administrative engine 820. The resolution controller 804 may be configured to perform any of the actions described according to the configurable rules at the prefetching rule store 808 and the resolution rule store 812 and may store data utilized in operations at the operational data store 816. Furthermore, the resolution engine may be configured to dynamically operate according to the information stored at the prefetching rule store 808, the resolution rule store 812, and the operational data store 816, even as the rules and data are added, modified, or deleted. Thus, in at least one embodiment, the resolution engine may operate according to the most up-to-date information and policies available at its disposal at the moment a resolution step is taken or just immediately prior to it. The operations of the resolution engine, thus, may change from session-to-session, from user-to-user, from time-to-time, and so on.

The prefetching rule store 808 stores one or more configurable rules that control the prefetching operations of the resolution engine. For example, prefetching rules may control what information is prefetched, the location from which information is prefetched and in response to what types of service requests or channel. Similarly, the resolution rule store 812 stores various rules that determine how the resolution engine may categorize a service request and what actions are taken in order to resolve a service request, both automatically and when intervention or approval of an agent is required. The resolution rules may further determine what actions an associate must take for each type of service request and may forbid certain actions to be taken by an associate without approval, such as those actions that have nothing to do with a service request, thereby preventing unauthorized or mistaken actions by an associate. The resolution rule store 812 may further store suggested associate actions, reminders and notes for each type of service request and may configure each to be automatically taken (or not) with a quick approval.

The operational data store 816 may store the service request information received from the interaction engine and the prefetched data retrieved from the various business unit systems and other internal/external sources. The operational data store 816 may further store and allow the resolution controller 804 to track one or more queued operations. Thus, the resolution engine 800 may queue or schedule one or more actions and, for example, may maintain a queue of service requests that requires opening, prefetching, processing and closing. Furthermore, the operational data store may contain one or more databases of service requests, received, the actions taken and the statuses of each service request. In at least one embodiment, the operational data store 816 further stores recent service requests, their corresponding prefetched data and their service history in a cached portion of the data store utilizing fast-access memory, allowing for recent requests to be found and retrieved quickly by the resolution engine 800 as well as the associates engine.

The administrative engine 816 allows for an administrator of the system to configure and customize the operations of the resolution engine 800. For example, an administrator may define and modify the rules at the prefetched rule store 808 and the resolution rule store 812, the types of data stored and the caching operations at the operational data store 816, the access capabilities and the information provided to the associates engine, and others.

Associates Engine

The associates engine allows associates of a financial institution to receive and view service requests received at the service engine, including prefetched information gathered by the resolution engine. Based on the information provided, the associate may approve and perform operations to resolve each of the service requests. In one embodiment, the associates engine may view and perform actions related to at least the service requests that require approval or associate intervention.

Figure 9:
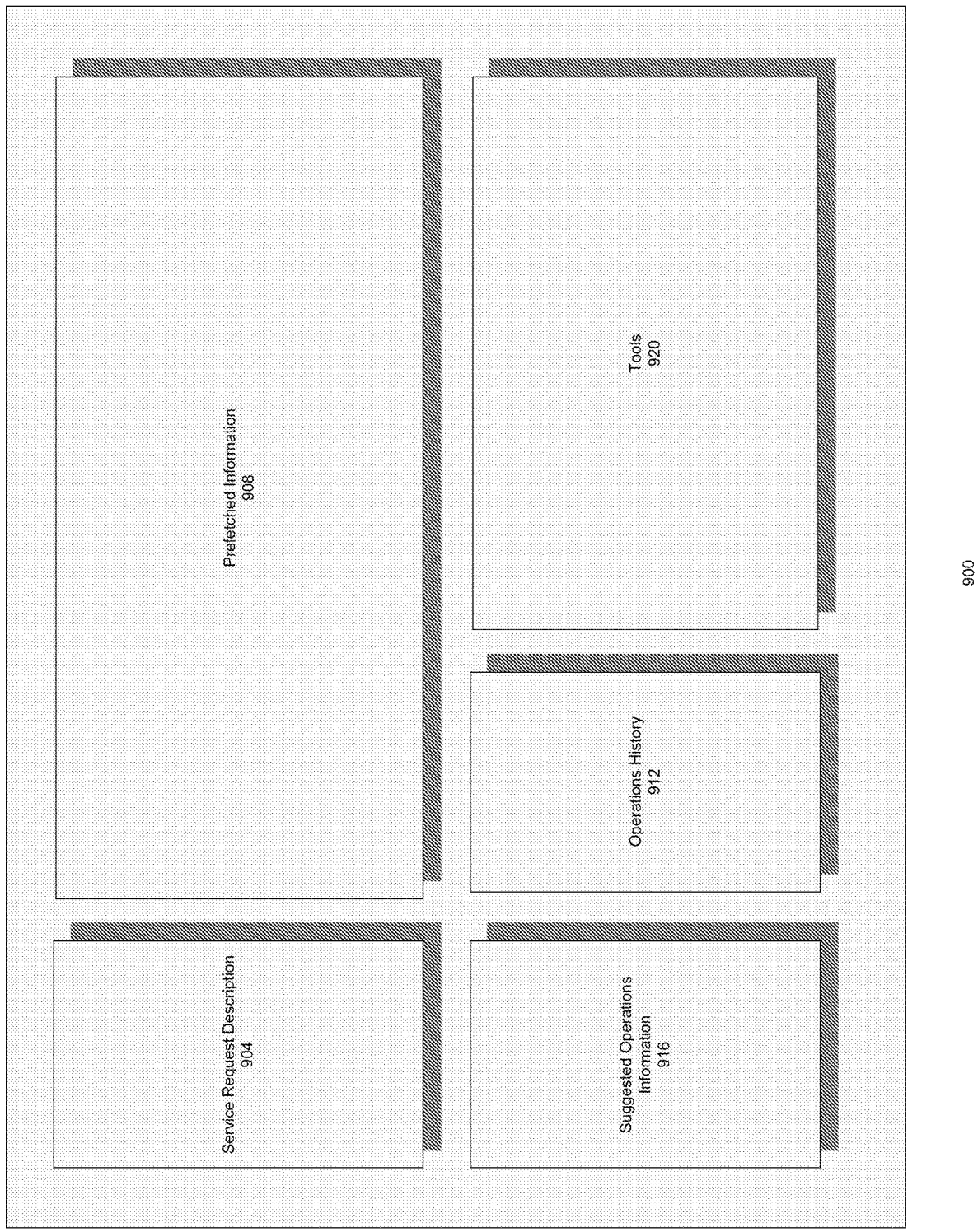
FIG. 9 is an exemplary depiction of a user interface presented to an associate in accordance with an embodiment of the invention.

The associates engine provides the associate with the service request information through a user interface, which may be displayed at a client device of the associate. For example, an associate may access the user interface through a workstation, a mobile device, or other any web-accessible device. The associate, for example, may access the user interface and perform associate operations at the associate computer 150 shown in FIG. 1B. FIG. 9 depicts an exemplary associates user interface in accordance with an embodiment of the present invention. As seen, the associate may be presented with a wide range of information through the user interface 900, including the service request description 904, prefetched information 908, operations history 912, suggested operations information 916, and tools 920.

Thus, the present invention allows an associate of a financial institution to have access to and view a unified user interface comprising of all the necessary information that one may require in resolving a customer request. Information about the customer is presented in an easy to understand manner and in a format that facilities the efficient resolution of the service request. In the preferred embodiment, the user interface generated by the associates engine minimizes the associates having to switch menus, windows, screens and the like.

The service request description 904 provides the associate with a description of the service request submitted by the customer (e.g., request type, date submitted, priority) while the prefetched information 908 may include at least all of the information that has been prefetched by the resolution engine. The prefetched information and the service request information may be aggregated or transformed in a manner that allows the user to easily understand the issues to be resolved and the information available that are relevant to the service request's complete resolution.

In at least one embodiment, the associates engine may cause only the information necessary to fulfill the service request to be provided to the user, even though additional information may have been prefetched by the resolution engine and received by the associates engine. Thus, only the most important information may be displayed, making the most of the user interface. Nonetheless, should additional information be needed by the associate, no additional requests are necessary, as the information may simply be provided to the associate instantaneously.

The operations history 912 may provide to the associate a description of the operations previously performed for the particular service request, related service requests, and other service requests of the account or the customer. Furthermore, the operations history 912 may provide logs of communications, correspondences and documents related to the customer's service request.

The suggested operations 916 provides a listing of operations that may suggest to the associate one or more operations necessary to resolve the customer request. Such listing may be generated by the resolution engine uniquely for the particular service request and communicated to the associates engine for display. The resolution engine or the associates engine, in one embodiment, may simply provide generic suggestive operations based on the service request type rather than generating the suggested operations on a request-by-request basis.

Finally, tools 920 provides the associates with a library of operational tools that may be necessary to fulfill a customer request. This may include the ability to approve, modify or reject one or more suggested operations to be performed by the resolution engine. Furthermore, tools 920 may allow an associate access to (or at least the ability to request access to) the databases of the various business units as well as other internal and external information sources, allowing the associate to retrieve, modify or delete data within each database, or at least request the business unit systems to make such changes as needed. Thus, tools 920 may aggregate the tools available to the associates of each of the existing business units of a financial institution into one single interface, allowing the associate to perform many of the same operations that an associate of each of the business unit systems may have access to.

In at least one embodiment, the associates engine may cause only a subset of the tools available to be shown on the main interface depicted in FIG. 9. Specifically, the subset of tools may be only those tools that are likely to be necessary to resolve the service request. For example, an associates engine may cause the user interface to have only the tools related to the customer's debit account, including those that would allow access and modifications to the data in the customer's debit account data. The associate may nonetheless access the remaining tools by modifying the options of the user interface or other methods well known in the art to provide such additional tools. In at least one embodiment, the tools and operations that are available to an associate are secured by a security engine of the system.

Security, System Monitor, and Training Engines

As seen from the features discussed above, a company's associate may access customer data and various services and applications (e.g., its tools) in fulfilling customer service requests. However, in order to protect the data from inadvertent modifications, unauthorized access, and malicious attacks, it may be necessary and beneficial to only provide associates with the resources that would be necessary to fulfill the service requests. However, the resources necessary to fulfill service requests may vary greatly across an organization from employee to employee. Employees, for instance, may have different responsibilities, capabilities, security clearances, and so on, each of which may dictate which resources are to be accessible by each employee. The resources necessary to fulfill the requests may also vary amongst the applications that associates use to fulfill the customer request. Some applications may provide access to different categories of data and while providing distinct sets of application actions.

Accordingly, in at least some embodiments of the present invention, the fulfillment system further includes a security engine that manages access to these resources based on an entitlement of the requestor. The access control features provided by embodiments of the security engine can further expand the ability of the fulfillment system including to manage the system demand by dynamically recognizing increased service request loads, notifying and reallocating team members to handle service requests, and managing access control to secured resources for these new team members, thereby allowing them to fulfill the service requests. Similarly, managers can dynamically assign roles based on current system demand, number of pending customer requests, and other factors on a real-time basis. The system then may be automatically updated to notify and provide users with instant access to the additional resources and to route calls and requests to the newly assigned user, accordingly. In one embodiment, the entitlements to particular applications, information or other data may be dynamically adjusted according to user feedback, system performance and status, and even historical data, as analyzed by an analytics engine. These and other features may be provided by a system monitor engine.

In addition, embodiments of the system further include a training engine that tracks and manages employee training. Employee training records may then be used by the security engine and the system monitor engine in providing access to secured resources and in assigning employees to teams, thereby ensuring that members with access to resources are adequately trained to properly and efficiently utilize the resources provided in fulfilling service requests. In these embodiments, the system will actively track the completion of the required tasks and, upon such completion, may provide the user with access.

The features and capabilities of these engines will now be discussed in reference to the management of authorization for users, which may include associates, managers, administrators and other users of the system. A person of ordinary skill in the art would recognize that the capabilities of the system are not be limited in scope to managing a particular type of employee or user, but may be configurable as necessary to support any user based on the needs of the organization.

Figure 10:
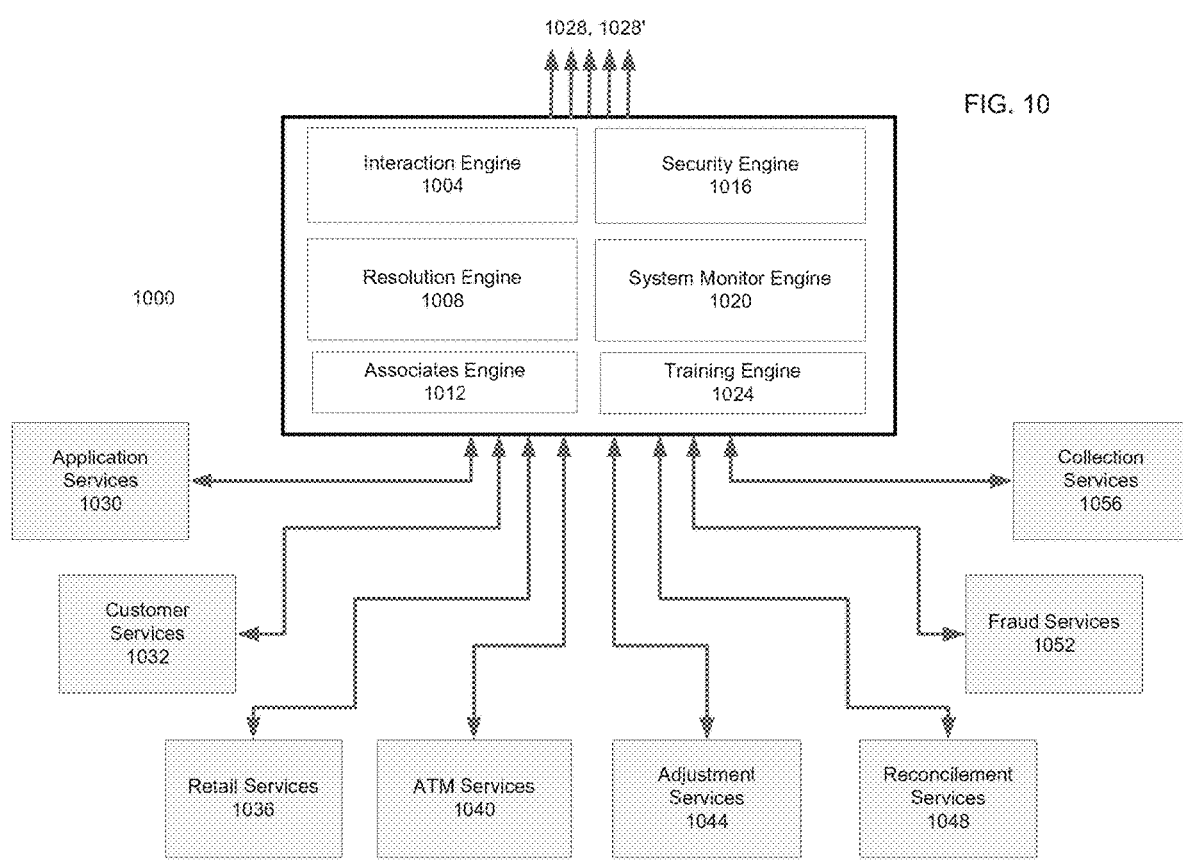
FIG. 10 depicts a block diagram illustrating a fulfillment system 1000 in accordance with an embodiment of the present invention.

Embodiments of the present invention include a security engine that manages the access to resources such as data, services, and applications based on the entitlement of the user and the role of the user, or in some embodiments, the system or device. FIG. 10 depicts a block diagram illustrating a fulfillment system 1000 in accordance with an embodiment of the present invention. The fulfillment system 1000 includes an interaction engine 1004, a resolution engine 1008, an associates engine 1012, a security engine 1016, a system monitor engine 1020, and a training engine 1024. The fulfillment system 1000 may be connected to a plurality of channels 1028, 1028' and a plurality of business unit systems 1030-1056. The fulfillment system 1000 may further have access to a plurality of business applications, services and tools, which shall be referred here collectively as applications. These applications may reside at or otherwise utilize data stored at a system connected to the fulfillment system, where these resources are needed to fulfill a customer request. Thus, at least some of the applications may reside at or provide access to the resources at business unit systems 1030-1056 at the organization, such as an application services system 1030, customer services system 1032, retail services system 1036, ATM services system 1040, adjustment services system 1044, reconcilement services system 1048, fraud services system 1052, and collection services system 1056.

The fulfillment system 1000 operates as a fulfillment hub in which all service requests are dynamically received over the plurality of channels. The requests are processed, resolved, and closed by the various engines of the fulfillment system 1000. Users of the system (e.g., associate) of the organization may facilitate the fulfillment of these service requests by accessing one or more applications. In embodiments where data is prefetched and/or where the associate processes service requests using a unified user interface (e.g., those provided by the associates engine 1012), the applications may be integrated into the unified user interface. In any case, the applications to which the user may have access to may be managed and controlled by the security engine 1016. In some embodiments, however, the user's access to these applications need not be directly through the fulfillment system 1000. Rather, the fulfillment engine 1016 may facilitate access to these applications by providing acknowledgement of the user's authorization to one or more applications. In addition, in at least one embodiment, the security engine may include services to manage single-sign on features, as known by persons of ordinary skill in the art.

Authorization to access data, to use applications, to perform operations, and so on, may be provided by the security engine 1016 based on a number of attributes related to the authorization request. These attributes, which may define an entitlement, may include the application that the user is utilizing; the principle that is requesting authorization (e.g., a user, a role of the user); and the securable resource. Embodiments of the system may take only one, some or all of these entitlement attributes into consideration when determining whether to grant authorization. In at least one embodiment, associated with each entitlement is an access control configuration that defines whether authorization should be provided or denied in view of these entitlement attributes.

Embodiments of the security engine 1016 may manage authorization for any type of securable resource. A securable resource, for example, may be an activity that the user is attempting to perform. Particularly, an activity may be defined or configured to be minute or narrow in scope or broader in scope. An activity may relate to data that is stored or managed at a system of the organization or at a third party system (or in some cases, even a customer's systems). An activity relating to data, for instance, may be: the modifying of a customer's record, accessing of a customer's credit card records, or filing of a customer's tax record on the customer's behalf at an agency system, such as the Internal Revenue Service. The data need not be limited to data stored at databases (e.g., customer databases), but may also include any data used or stored at the system, including web pages, wilds, and even publications.

In addition, an activity may relate to a service or business process executed at the organization. For example, an activity may be part of a check adjustment business process at the organization, whereby the amount of money that is deposited into a customer's account from a check is adjusted. The user may initiate this business process to change the issued amount from $20 to the correct amount of $2000. This is especially useful where certain services or business processes require particular levels of authorization (e.g., where only a manager can authorize the check adjustment for an amount greater than $1000.) Thus, in numerous embodiments of the present invention, business processes that already exist and may be developed in the future by the organization, may be automatically secured. Authorization for such services or business processes need not be limited to the initiation of the business processes, but may also relate to any steps or actions within the business process. For example, while authorization for the initiation of a check validation business process may be provided for any user, authorization for closing the business process may only be provided for a manager of the organization.

An activity may also be undertaken using a particular application. An organization may rely upon numerous applications, each of which may relate to particular services provided by the organization and the various branches of the organization. Authorization for access and to perform any operation within any of these applications may also be secured by the security engine 1016. Moreover, the security engine 1016 may secure access to applications within applications, such as where an application integrates, provides access, or links to another application.

The security engine 1016 may manage authorizations based on the principles performing the activity, which may be considered a user of the system or groups of users based on one or more definable roles. Thus, in a number of embodiments, users of the system may be assigned to one or more definable roles. As a basic example, a bank teller may be assigned the role of "bank teller" and/or "associate at retail locations," whereas a manager may be assigned to a role of "supervisor." The roles of users may be defined and assigned based on any scheme, including the team, division, or branch in with which they work; their specialty, skill set and/or experience; their primary actions within the organization; the services they provide to customers (if any); their position within the organization's organizational hierarchy (i.e., their supervisors); and others. The use of rules, thus, provides for a logical grouping of entitlements. Roles may be narrowly defined or broadly defined. As seen in the above example, the roles that are assigned may be based on formal or informal titles of the employee at the organization, e.g., teller, branch manager, developer, and retail manager, or based on seniority of the user in the organization.

The security engine 1016 may therefore allow an administrator, manager or some other user to assign employees to one or more roles based on these and other employee attributes, thereby allowing for the grouping of users with similar role attributes within the organization to be provided the same set of access. An administrator may quickly and efficiently manage (i.e., add, modify or delete) entitlements for groups of users, rather than having to manually manage at a user-by-user level. This may be particularly useful where new processes, applications, or resources are added or made accessible by the fulfillment system. For instance, rather than having to manually edit each user's entitlement to add authorization to access a new feature of a loan application software that allows the user to modify user loan history, an administrator may simply modify the entitlements configurations for all loan specialists to grant such access.

In one embodiment, the security engine 1016 may detect, assign, and recommend roles of users based on the applications the users utilize on a day to day basis, data that they typically access, services or business processes they typically are assigned to or fulfill, the user's training and certification profile, work experience, and other user-specific attributes. Furthermore, in one embodiment, user roles may be detected, assigned, or recommended based on organizational charts, the other users that a user works or communicates with, a user's pay grade, and other organizational data.

Because users may be assigned to multiple teams or perform a number of different functions, embodiments of the system supports the assignment of multiple roles for each user. In at least one embodiment, where there are conflicting authorizations, such as where one role allows for access to a database while another role denies the access, the security engine 1016 will be configured to deny access, while in another embodiment, the security engine will take the opposite approach and override any denial of access where there is at least one role that allows for access. In yet another embodiment, the resolution of conflicting entitlements may be resolved based on the particular activity. The determination may be made dynamically, based on historical data. For instance, the system may determine to provide access despite conflicting entitlements where a manager has overridden the denial of access for the specific user every time in the past. In any case, a manager may be notified where there are conflicts, may be provided with recommended resolutions, and alerted where the conflicting entitlements have been overridden and automatically resolved.

While it is efficient and effective to manage user entitlements based on roles, it may be necessary, in some cases, to define entitlements at a user-specific level. This may be because the user performs a very specific function that is unique from his or her typical role, whereby a user-specific set of secured resources is required. In such cases, in addition to (or instead of) roles, each user may be assigned more or less entitlements. Using this feature, a user may not only be provided with additional access to resources, but conversely may also be provided less access to resources. For example, an employee may be restricted from access to a particular database that is otherwise unrestricted for bank tellers. This may be because the specific user has not yet been trained in relation to the secured resource or any other reason.

In at least one embodiment, a principle may be defined as an application (e.g., an application causing another application to perform an activity), a system or computer (e.g., a system causing the application to perform the activity), or an entity. For instance, an application for creating and modifying customer loan applications may be configured to be entitled to access the organization's customer database and the loan database. These applications may also include applications that perform actions in another application. Furthermore, entitlements may be defined at a system or computer level. For example, one or more computers or systems assigned to the fraud department may be entitled to access resources that allow users to access fraud business processes and to adjust customer balances based on fraud. Similarly, entities, internal or external to the organization, may be entitled to particular resources. This may include any entity that may be recognized by an application and include teams, groups or branches of the organization.

In one embodiment, the security engine 1016 considers not only the activity (or more generally, the securable resource) and the principle associated with the activity in determining whether to provide authorization, but also the application through which the activity is performed. Accordingly, in an embodiment, authorization for each role and activity may vary from application to application. As a result, a user assigned to a "loan specialist" role may be allowed to modify user account data using a first application, but may be denied to do so in a second application. An application may be a software application, a web site, a database, or others. In one embodiment, an application can be any software, website, or database that is utilized by employees at the organization.

Figure 11:
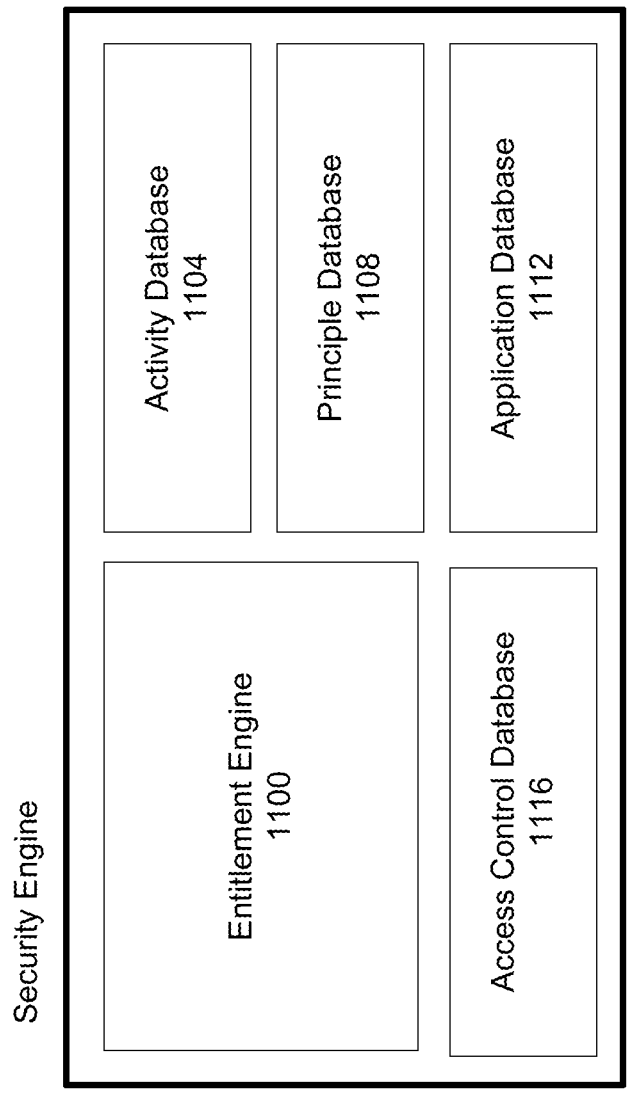
FIG. 11 is a block diagram of the security engine in accordance with an embodiment of the present invention.

FIG. 11 depicts a block diagram of the security engine in accordance with an embodiment of the present invention, including an entitlement engine 1100, an activity database 1104, a principle database 1108, an application database 1112, and an access control database 1116. As a person of ordinary skill in the art would recognize, each of the activity database 1104, a principle database 1108, and an application database 1112 may contain one or more tables consisting of a plurality of entries describing activities, principles, and applications, as discussed above. FIGS. 12A, 12B and 12C provide exemplary tables contained in the activity database 1104, a principle database 1108, and an application database 1112 in accordance with an embodiment of the present invention. Furthermore, FIG. 12D provides an exemplary table of the access control database 1116 for one application, in accordance with an embodiment of the present invention.

As seen in FIG. 12A, for example, the activity database may describe general actions that a user may take, such as creating a user, editing user personal information, importing a user, or deleting users. Each of the activities in the database may include an activity key, which can be used in other databases to reference the activity, and a description of the activity. The activities that are listed in each table of the activity database may include all of the actions that can be taken within one application. In some embodiments, each table may include actions associated with multiple applications.

In the exemplary principle database table in FIG. 12B, various principles, including users, roles, computer and entities are defined. As a person of ordinary skill in the art would recognize, each entry may also contain relational data. For instance, for each role, the users assigned to the role may be readily determined.

In the exemplary application database table in FIG. 12C, all of the applications that are secured by the security engine may be listed, including each of the application's associated database key. In one embodiment of the present invention, this and the other databases may be automatically populated by the security engine 1016 by accessing the systems of the organization to detect and determine all of the applications, principles, and activities that are available and could be secured. In these embodiments, a manager or other user may then simply select a list of the detected applications, principles and activities when defining the access control.

An access control database may include a plurality of tables that provide the access control configuration for each combination of an activity, principle and/or application. Thus, the entries of the access control database can reference the activity, principle and/or application that are listed in the individual activity database 1104, principle database 1108, and application database 1112. FIG. 12D, for instance, provides an exemplary table contained in the access control database. In particular, the exemplary table describes the access control settings for one application, in this case, "LoanHelper". The entries of the table provide the activities that are allowed (or not restricted) for particular roles, users, entities, computers/systems and/or applications. As a person of ordinary skill in the art would recognize, in this embodiment, the access control database 1116 will include a table for each of the applications supported by the system. A person of ordinary skill in the art would recognize that the application, principle, activity, and access control databases, such as those in FIGS. 12A, 12B, 12C, and 12D, may be in any other format or structure.

Figure 13:
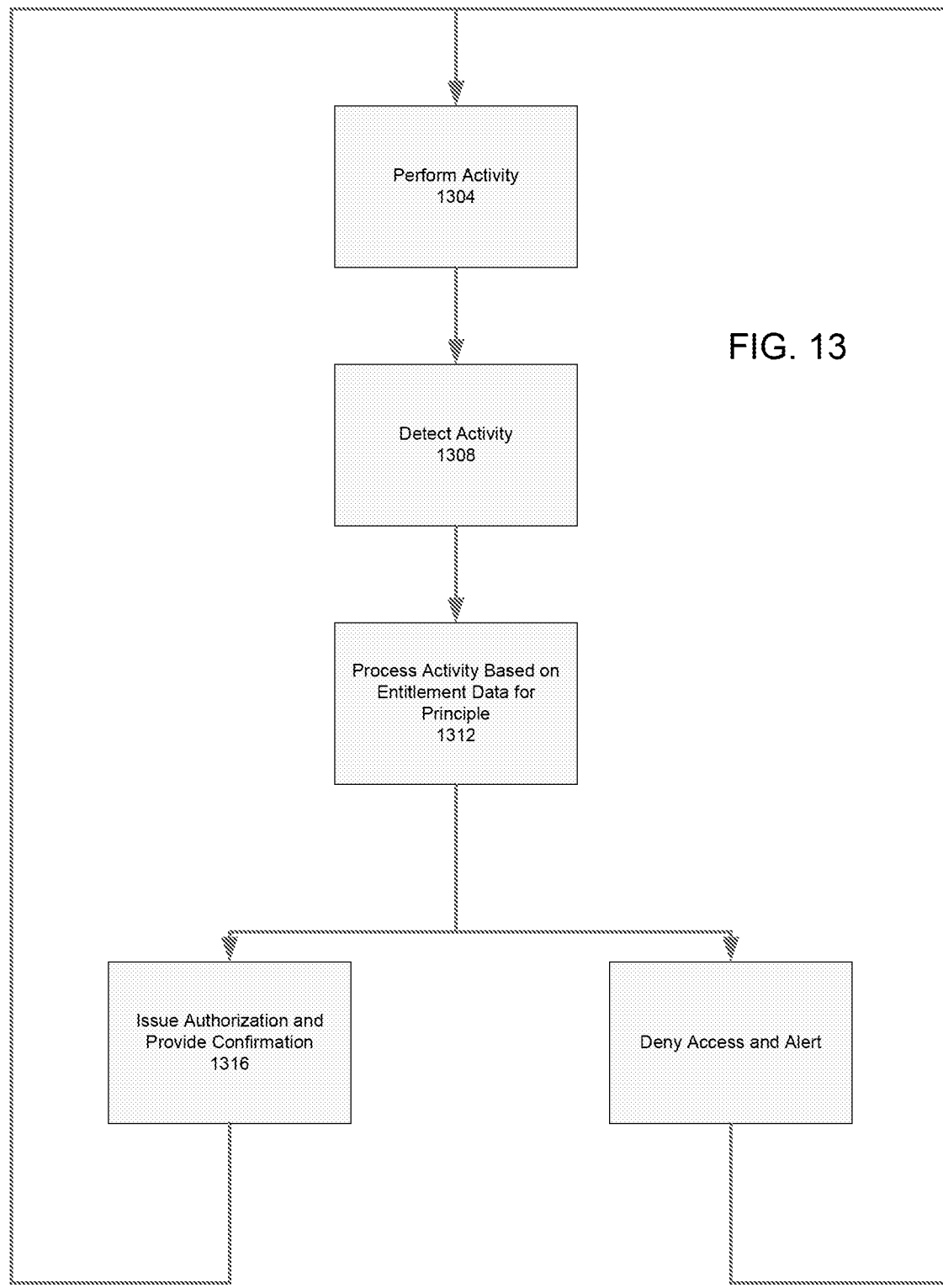
FIG. 13 is a flowchart of a method for determining an authorization to perform an activity in accordance with an embodiment of the present invention.

FIG. 13 depicts a flowchart of a method for determining an authorization to perform an activity in accordance with an embodiment of the present invention. At 1304, an activity is performed. For instance, after having received a service request indicating that one of the customer's personal checks was erroneously processed (e.g., $10 instead of $100), a transaction adjustment specialist may request to modify a customer's deposit entry by modifying the transaction value in a customer transaction database. At 1308, security engine 1016 may detect the activity being performed by the user. At 1312, the activity is processed based on the entitlement data for the application that the user is performing the activity in. This determination is based on the user and/or his or her assigned role(s). At 1316, activity is authorized to be performed, or alternatively, at 1320, the operation is denied and the user is notified. Thus at 1316, the transaction adjustment specialist's requested modification of the customer's deposit value is processed and the specialist is provided with a confirmation of the successful modification.

Figure 14:
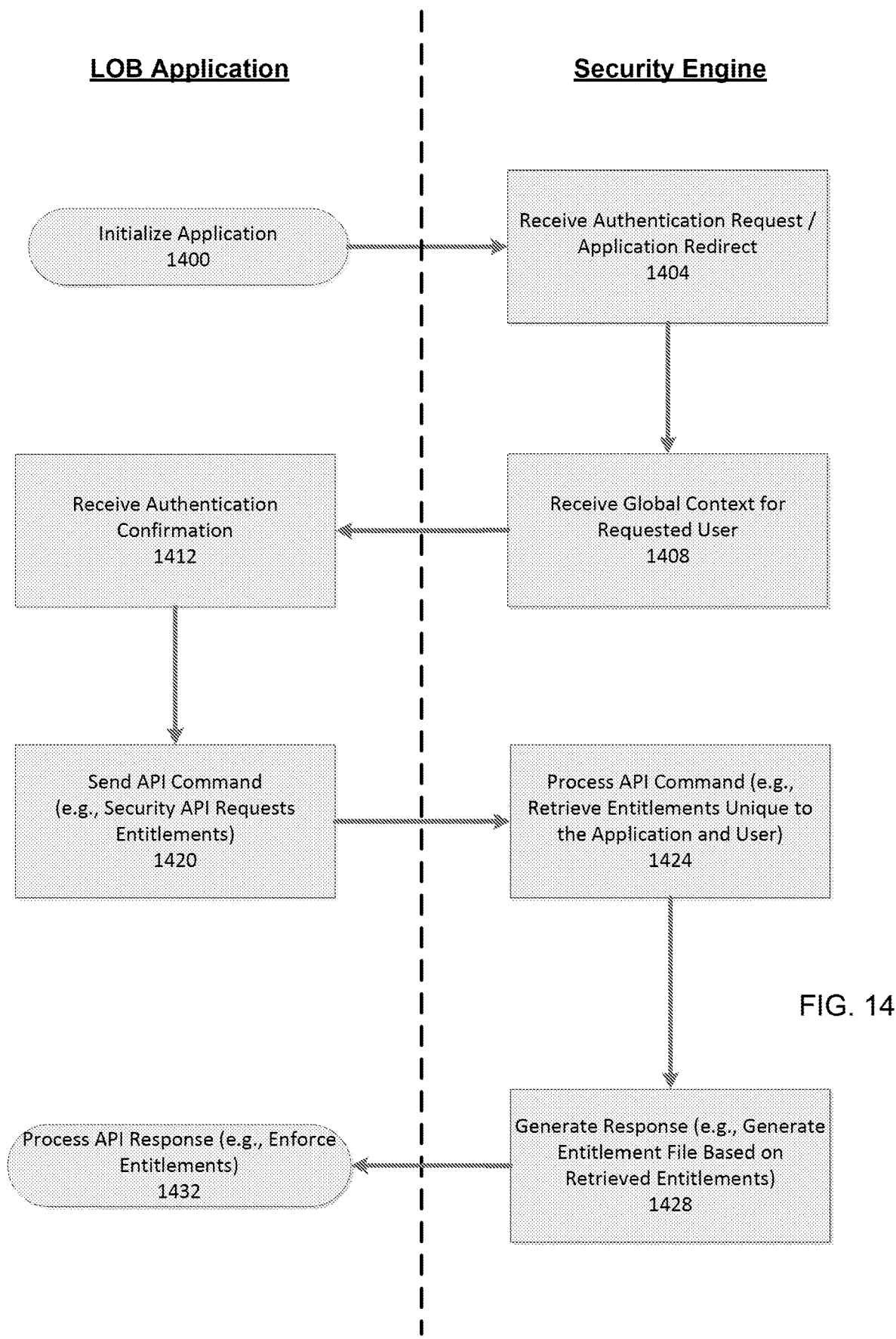
FIG. 14 is a flowchart of a method for determining an authorization to perform an activity in accordance with an embodiment of the present invention.

FIG. 14 depicts a flowchart of a method for determining an authorization to perform an activity in accordance with an embodiment of the present invention. In particular, FIG. 14 describes the operations of the security engine and other components of the fulfillment system in providing security services. At 1400, the transaction adjustment specialist has initialized a Deposit Adjustment application (referred here as "LOB application"). He may do so by opening the LOB application at his terminal, or in one embodiment, by entering a URL address of the LOB application in a browser. Thus, in various embodiments of the present invention, the LOB application is accessible by accessing a web site, e.g., via a web browser.

At 1404, in response to opening the application, the LOB transmits a request to sign-in into the application. The request is directed to the security engine, which authenticates that the request is coming from an authenticated user. This may require the user to enter the user's username and password or provide other forms of authentication. In an embodiment where the fulfillment system supports single sign-on (SSO) authentication, as known in the art, and where the user has already been authenticated by a single sign on (SSO) engine, the security engine may authenticate the request through single-sign methods well known in the art. For instance, the application's request at 1404 may include an authentication token from which the security engine may validate for single-sign on authentication. In one embodiment, the security engine may forward the authentication token to a single sign-on engine for validation.

At 1408, in response to receiving authentication, the security engine may receive the global context for the requested user, including data describing the user. In one embodiment, the security engine may receive and store data describing the Lightweight Directory Access Protocol (LDAP) membership data. For instance, the following data may be stored at the security engine for the specialist:
dn: cn=Jane Doe
cn: Jane Doe
employeeNumber: 12345
telephoneNumber: +1 888 555 6789
manager: cn=Barbara Doe
objectClass: inetOrgPerson
objectClass: organizationalPerson
objectClass: person
objectClass: top At 1412, an authentication confirmation is returned from the security engine to the LOB application, which may cause the LOB application to automatically transmit a request for authorization from the security engine. In one embodiment, the confirmation that is returned from the security engine includes a unique authentication token that may be used by the application to submit requests to the security engine.

At 1416, the application can call functions via an application programming interface (API) provided by the security engine. With each API function call to the security engine, the application may automatically include the authentication token. Thus, in an embodiment of the present invention, an application, using the security engine API, may call a number of functions including functions to: return a list of applications managed by the portal; return a list of roles used in an application; return a list of role memberships for a user and application; return a list of entitlements granted to a user; return a list of activities for an application; associate a user with a role; delete association of a user with a role; remove the user from all application roles except the specified role; grant an entitlement to a user; grant an entitlement to a role; and others. Various other functions may be provided as part of the API.

At 1420, in response to an API command, the security engine processes the command and identifies the application, user or computer. In embodiments in which an authentication token is included as part of the request, the security engine processes the authentication token to identify the application, user or computer.

At 1424, the security engine processes the authorization request in order to generate an entitlement file for use by the application. Thus, the security engine may process the user's LDAP data (describing the user) and data describing the LOB application (which may be gathered from the request, e.g., from metadata from the HTML POST authorization request) in generating the entitlement file.

The security engine may then process the LDAP data to identify the user. Based on the user's identification, the security engine may, at 1424, access the principle database to determine the user's role, if any. In one embodiment, the LDAP data includes the user's role. In this example, the user may be identified to be part of the "account specialist" role. In addition, the security engine may access the application database to identify the application. Thus, here, the application may be identified as the Deposit Adjustment application. In either case, the system may access these databases and identify the database keys representing the user's role and the application. Based on the user's role and the application, the security engine may access the access control database to locate all access control entries that contain both of the identified user's role and the application, and collect the data for placement into the entitlement file. The security engine may also locate and collect entries containing the identified user and application. These entries, for example, may provide for user-specific (rather than role-specific) entitlements.

At 1428, the entitlement file is generated based on the collected entitlement data. In one embodiment, this file is an extensible Markup Language file. This file is returned to the LOB application.

The LOB application, at 1432, processes the entitlement data and utilizes the data to provide authorization based on the entries contained in the access control entries. The user may also be provided with access to the application. Once the user has received the entitlement list, the application may enforce the entitlements.

At the application, selection of activities that require authorization will cause the application to check whether the selected activity is one of the entitlements provided in the entitlement list. Thus, for instance, when a user selects a user interface element (e.g., a button) to modify the current customer account, the selection will cause the application to check whether the selected function is contained within the entitlement list. The application will process the entitlement list, identify the selected function, and read the access control configuration data, which will indicate whether the selection function is allowed. If authorized, the application page for modifying the customer account will automatically load. Otherwise, an error message may be provided indicating that the user is not authorized.

In various embodiments, managers are assigned to manage one or more sets of users in accordance with assigned roles, functions within ESDS workflows, or corporate hierarchy. Thus, managers may, on a real-time basis, assign additional users to particular workflows, provide additional access to applications, services or information, and require additional training, amongst other functions. In addition, the manager may recognize when system demand for his or her assigned roles, function and/or functions within the ESDS is high and that additional employees may be required on a temporary or permanent basis to meet demand.

Figure 15A:
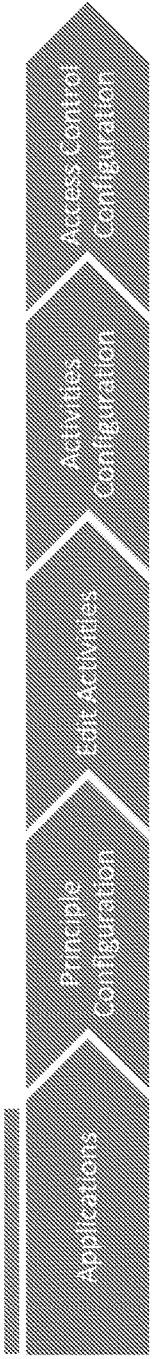
Figure 15B:
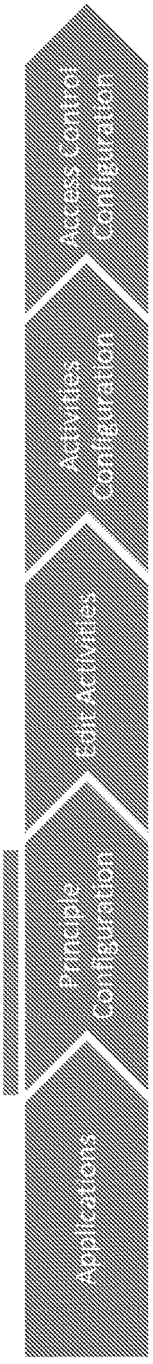

FIGS. 15A-15E provide exemplary user interfaces that may be accessible by a manager to define the parameters of entitlements in accordance with an embodiment of the present invention. FIG. 15A, for instance, shows a user interface that provides the user with access to the listing of applications currently supported by the security engine (e.g., as stored in the application database). A user may select on each individual application to define each application's security model. By selecting on a particular application, the manager may define the roles that have access to the application. FIG. 15B provides a user interface that allows a manager to associate roles for a given application.

Figure 15C:
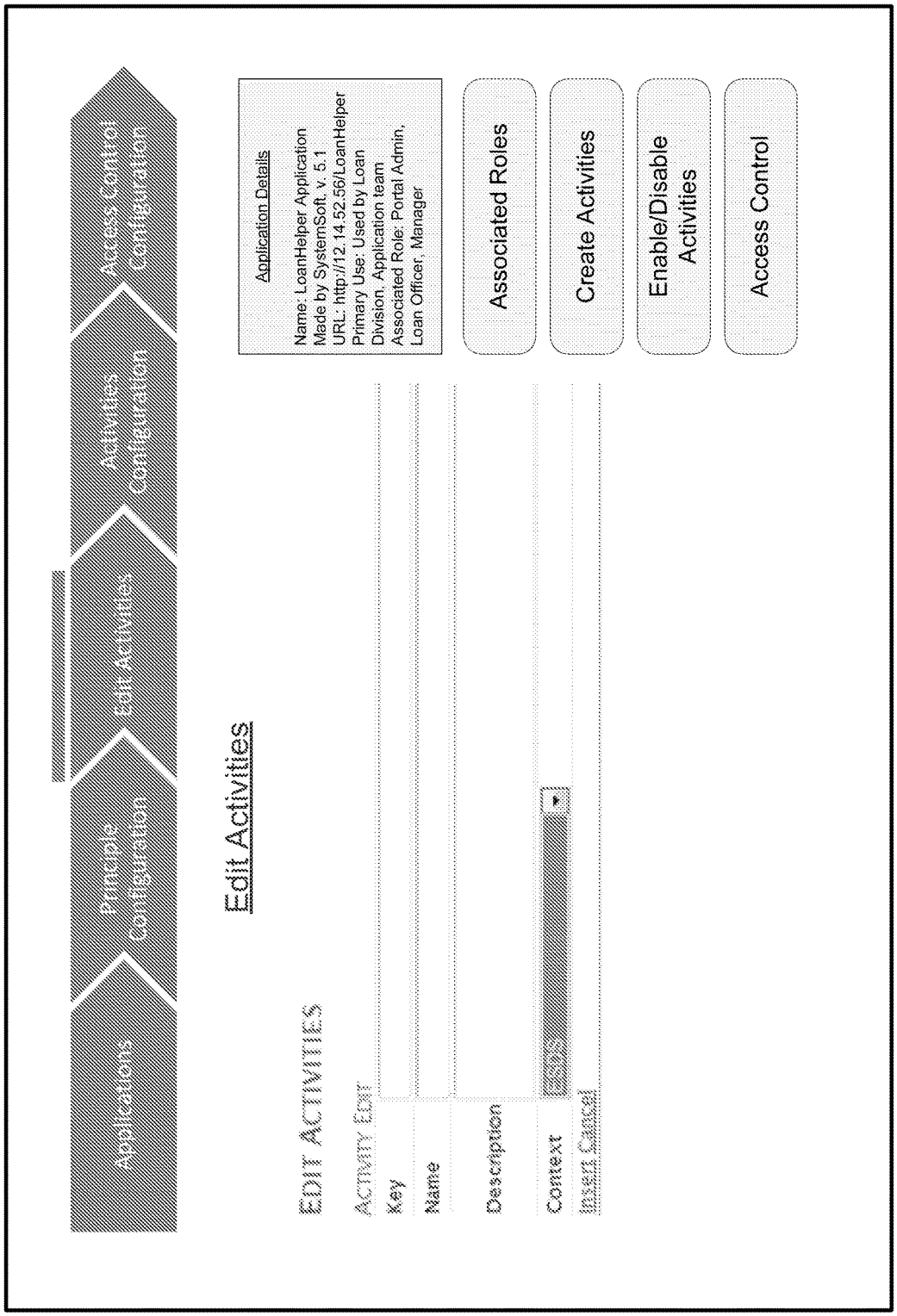
Figure 15D:
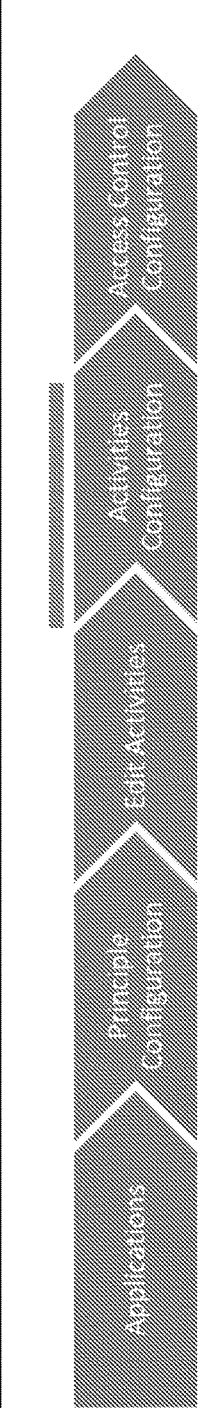

The manager may further define the activities that may be secured by each application, as shown in FIG. 15C, wherein the user may define the key (which may be used as the activity's database key), the name and description of the activity and context for which the activity will be used. In one embodiment, the system allows previously defined activities to be used across applications. FIG. 15D provides a user interface accessible to a manager to associate activities to the application. A user may enable or disable the activities that should be secured. Furthermore, FIG. 15E provides a user interface that allows the manager to define the access control for each activity in a selected application and for a selected role (or user).

The access control features provided by embodiments of the security engine 1016 open up a wide array of system capabilities. For instance, managers may reassign users to other teams to handle different service requests and quickly provide the user with access to the necessary resources. In response, the security engine 1016 may automatically modify the entitlements of the employee access by assigning the employee an entitlement role corresponding to the employee's new responsibility or team. To do this, the security engine 1016 may modify the entry of the employee in the principle database to indicate the employee's newly assigned role. Because the assigned role may already be associated with various entitlements across a number of applications, as may be defined in the access control database, the assigning of the user to the new role automatically gives the user access to all of the applications and activities associated with that role. Thus, in this example, the security engine may not need to take any further operation to effectuate the user's reassignment and secured access. In similar fashion, employees may also be assigned by a manager to perform particular tasks or to handle particular service requests.

As discussed briefly, embodiments of the fulfillment system further include a system monitor engine. The system monitor engine, such as the system monitor engine 1020 of FIG. 10, operates in concert with the security engine 1016, the training engine 1024 and other engines of the system, to track system load and demand, team assignments, and employee training. Utilizing the collected system status data, the system monitor engine can detect high service request demand and to notify and assign qualified employees to teams, division, or branches to handle the increased service request volume.

Figure 16:
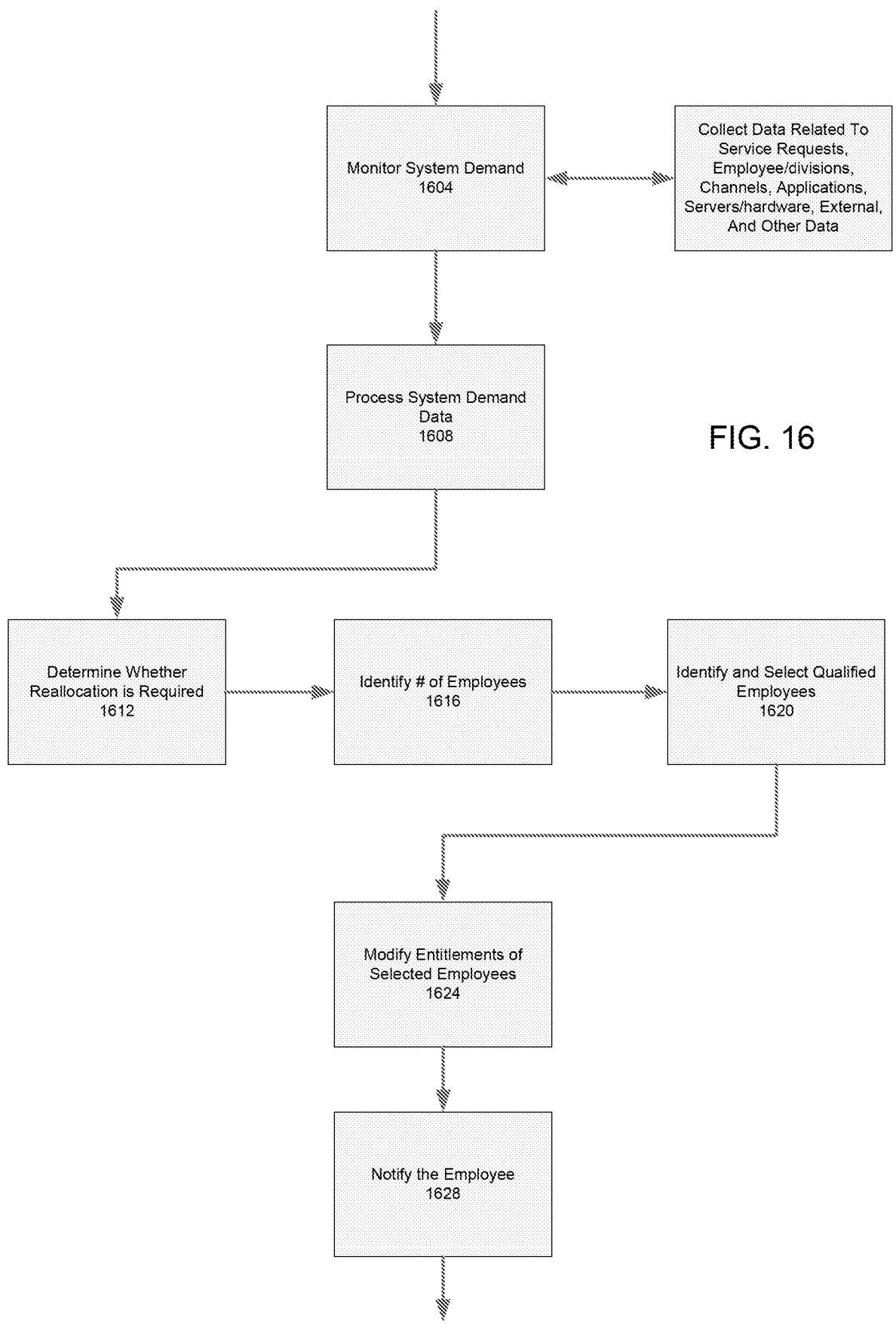
FIG. 16 depicts a flowchart of a method of monitoring system demand and dynamically allocating resources to meet system demand in accordance with an embodiment of the invention.

FIG. 16 depicts a flowchart of a method of monitoring system demand and dynamically allocating resources to meet system demand in accordance with an embodiment of the invention. The method of FIG. 16 will be discussed in reference to the system monitor engine 1020 of FIG. 10. At 1604, the system monitor engine 1020 monitors system demand. Note that this monitor step may operate in conjunction with the additional operations discussed below. In other words, the system 1020 may also be monitoring the system demand, even as it processes the system demand, determines the need for reallocation, and performs the reallocation.

The system monitor engine 1020 may track the service requests received at the fulfillment system 1000. For instance, it may track the requests received at the interaction engine 1004, including the type and scope of the request of the service request and the channel through which the service requests are received. Because the tasks—and therefore the training, experience and expertise—necessary to effectively process a service request may differ depending on the type and scope of the request, the system monitor engine 1020 may utilize the collected information to identify the qualified employees that can help with the specific service requests. In addition, the system monitor engine 1020 may track the type of requests that are currently being processed by the resolution engine 1008, which may provide additional details of the current system status. Other types of data may be collected from the system. For instance, the system may track the status of the employees that are currently active (e.g., the number of employees that are available, busy, etc.), status of the available channels, activities at applications utilized by the organization, number of users connected to the fulfillment system over each of the channels, status of the fulfillment system (e.g., at a technical level—active number of servers, amount of memory, bandwidth, etc.), and external data such as stock market, weather, and social media data.

The data collected by the system monitor engine 1020 may be stored at a historical system demand store of the system monitor engine 1020 (not shown in FIG. 10). In one embodiment, the engines of the fulfillment system 1000 are configured to automatically provide the demand data to the system monitor engine 1020. The data may be tracked, retrieved, or received by the system monitor engine 1020 on a real-time basis, at definable intervals or on an administrator's command.

At 1608, the collected system status data is processed. In one preferred embodiment, this data is processed in real time. The comparison may be conducted for each service request type, business unit, and/or channel. It should be evident to a person of ordinary skill in the art that other types of comparisons may be made based on any number of categories or methods that can be used to differentiate the different service requests currently being received. For the purposes of providing an example, this disclosure will focus on the processing of service requests based on a service request type, but a person of ordinary skill in the art will recognize that this example is not meant to limit the scope of the invention from other possible processing parameters.

As part of this processing, the system monitor engine 1020 may process the number of service requests currently being received and/or processed at the fulfillment system 1000 and compare the number of requests with the number of employees that are currently being allocated to handle the service requests. The system monitor engine 1020 may also determine the average processing time for each type of service request and channel and the average wait time for customers.

In addition, the system monitor engine 1020 may compare the number of service requests received at the interaction engine 1004 with the number of service requests being processed at the resolution engine 1008 to determine the current system trend and to predict the system status in the near and long-term. For instance, if both engines are currently experiencing a backlog of service requests, then the system monitor engine 1016 may determine that employees need to be reallocated in order to meet the high demand. On the other hand, if the interaction engine 1004 is currently receiving a large amount of service requests but the number of service requests being processed by the resolution engine is minimal, then the system monitor engine 1016 may determine that reallocation is not required because service requests will be adequately handled once they are transferred from the interaction engine 1004 to the resolution engine 1008.

Furthermore, the system monitor engine 1020 may compare the number of service requests for each service request type against the historical system demand, as may be stored at a historical system demand store. This comparison may be conducted, for example, to determine whether the current system demand is consistent with historical trends for the particular time of day, day of the week, month or, even, season. For instance, it may compare the observed system demand data to determine that the current demand for fraud-related service requests is two standard deviations higher than the usual demand for a Friday afternoon and that, therefore, additional employees should be reallocated. In one embodiment, the system monitor engine 1020 can utilize the comparison between expected system demand versus observed system demand to determine the number of employees to reallocate.

The system monitor engine 1020 may also rely upon the historical data to predict whether the current demand may be increasing or decreasing. For instance, even if the system monitor engine 1020 determines that current system demand is within acceptable parameters such that no allocation of additional employees is necessary, it may predict that the number of requests will increase in the short term such that additional allocation is necessary after all in order to anticipate the heightened demand. As another example, the system may detect that the interest rate, as observed from an external source for example, has decreased to record levels. Based on this observation, it may anticipate that the demand for services related to mortgages and refinancing will increase in the next week. Based on this determination, it may alert a manager with or automatically reallocate employees (e.g., from one team to another) in advance of the heightened demand, thereby anticipating and preventing system overload.

At 1612, the system monitor engine 1020 determines whether reallocation is required and identifies areas where additional employees may be needed. The system may determine, for example, that employees need to be reassigned to another team to handle service requests on a temporary or permanent basis. The system may also determine that particular service requests or tasks that are waiting processing should be assigned to particular employees.

The system monitor engine 1020 may make its determination based on parameters that have been set by a manager or others. These parameters may also be based on service level agreements (SLAs). In one embodiment, the parameters may be dynamically set using historical trend data and predictive algorithms. Embodiments of the system supports any type of parameter that may be related to current system demand, including wait time, average number of services received in a time frame, number of employees servicing requests, number of service requests backlogged, average service request processing time, employee to service request ratio, user feedback, and others. In addition, parameters may be related to the status of the organization or the industry (e.g., interest rate, stock market status, tax rate, prices); news (e.g., natural disaster, employment rate, corporate and government overthrow, shutdown, or bankruptcy, release of new products and technology), weather, social media, and any other types of data that may affect system demand. In this example, the system determines that employee reallocation to another team on a temporary basis is required.

At 1616, in response to determining that allocation is required, the system monitor engine 1020 identifies the number of additional employees that will be needed. This determination, too, may be based on historical data. The system may be configured to rebalance the system within user-configurable parameters. For instance, it may be required to rebalance the system within a particular timeframe and may reallocate employees so as to achieve this goal. In one embodiment, the system may increase the number of employees that are added to handle the heightened system load in a continuous manner until system demand decreases or are within acceptable parameters.

At 1620, the system monitor engine 1024 may identify the employees that are qualified to process the type of service requests that are currently being received and/or processed in a high volume. This determination may be based on previous experience, previous assignments of role entitlements, training profile, certifications and other information. In one embodiment, the system may identify employees who are not perfectly suited to handle the service request, but who have the experience, training, and certification that demonstrate a capability to handle the service requests nonetheless. This may be useful where there are simply no employees currently available with the exact background needed.

In one embodiment, the system ranks currently working employees based on their background to determine the employees who are most capable of handling the current type of service request and reassigns employees based on this ranking. In selecting employees, the system monitor engine 1020 may also take into consideration the current demand for the type of service requests that the employees are currently handling. Thus, the system monitor engine 1020 will select employees currently experiencing low (to moderate) demand.

In one embodiment, the system supports processing of service requests by assigning service requests based on crowdsourcing. Participants who have completed required training for a type of service request may actively seek and bid on service request contracts and may be available for selection by the system or manager to perform tasks, process service requests and be assigned to a team on a temporary basis.

Furthermore, system monitor engine 1020 may reallocate employees not just to service the service requests with high demand, but also reallocate employees to replace employees that have just been reallocated, and so on. In other words, in at least on embodiment of the present invention, the system will continue to reallocate employees in order to balance system demand across the system.

The system monitor engine 1020 may further select the employees on various other user-set parameters. For instance, it may favor employees that are less senior to be reallocated, and furthermore, it may favor reallocation employees between teams that perform similar functions or in the same field or industry. Furthermore, it may avoid reallocating employees from a team because a user parameter requires the team to have a minimum number of members.

At 1624, the system monitor engine 1020 communicates with the security engine to cause it to provide the reallocated employees with access to secured resources that are necessary to receive and process the service requests. In one embodiment, the security engine 1016 may provide access by assigning the employee the entitlement role associated with his or her assigned position, thereby automatically giving the user access to all secured applications and activities permitted for that assigned role. In one embodiment, the system is automatically configured to route phone calls, chat requests, emails, and other forms of communications to the user. At 1628, the employee is notified and instructed of the reallocation and his or her system may automatically be configured to handle incoming service requests.

In the preferred embodiment, access to sets of applications, services and data are dependent not only on managerial assignments, but also on the completion of training courses or the performance of particular actions. In one embodiment, the training engine 1024 actively tracks the training and certification profile for each employee, including tracking the completion of the required tasks and, upon completion, providing the user with access.

The training engine 1024 may be connected to one or more training programs and systems, internal and external to the system and it may collect training results and other data from these systems to maintain a training and certification profile database (not shown in FIG. 10). The training engine 1024 may also track the training that each employee may need to complete in order to be qualified to be assigned an entitlement role and to perform particular activities within an application.

Upon the completion of these tasks, managers may be automatically notified that the user is qualified to fulfill particular roles (or to perform particular activities). The manager, in response, may cause the system to automatically update the databases. In one embodiment, the security system is capable of storing a list of roles that each user is qualified to be assigned to, activities that the user is qualified to perform and/or the application that the user is qualified to access. A manager or the system can use this information in the future in assigning tasks or reallocating employees.

These examples and embodiments are merely illustrative of the fulfillment system of the present invention. While particular embodiments of the invention have been illustrated and described in detail herein, it should be understood that various changes and modifications might be made to the invention without departing from the scope and intent of the invention. Indeed, it should be readily apparent to one of ordinary skill in the art that the presently disclosed alert system may be modified to operate in an operational banking computer system.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A fulfillment system for providing services to a customer in response to a customer request through one or more network connected channels, the fulfillment system comprising at least one processor in communication with a memory, the processor configured to:
    receive a request from a customer through one or more network connected channels, wherein the processor is further configured to standardize an interaction with the customer with another interaction with at least one other customer through the one or more network connected channels based on a standard library of rules to generate a standardized customer response to the customer and to the at least one other customer;
    process the standardized customer request and determine a secured activity required to resolve the customer request;
    grant employees access to secured resources associated with the secured activity required to resolve the customer request, granting of the access comprising at least the following:
        detecting initialization of an application associated with the secured activity;

identifying an authenticated principal associated with the secured activity;

retrieving entitlement data associated with the authenticated principal and the application, the entitlement data including at least access control data for a plurality of secured activities supported in the application and at least one dynamically assigned role attribute;

generating an entitlement file by processing the entitlement data;

transmitting the entitlement file;

receiving the entitlement file;

determining that the principal is permitted to perform the secured activity in the application based on the entitlement data in the entitlement file; and permitting the principal to perform the secured activity in response to the determining.

2. The fulfillment system of claim 1, wherein the authenticated principal is a user, an entitlement role, a computer, an entity, or an application.

3. The fulfillment system of claim 2, wherein the entitlement role is associated with a plurality of users with at least one common attribute.

4. The fulfillment system of claim 2, wherein the permitting of the requested secured activity includes determining that the authenticated principal is a first entitlement role that is permitted to perform the secured activity in the application, wherein the granting of the access further comprises associating a user with the first entitlement role.

5. The fulfillment system of claim 1, wherein the granting of the access further comprises generating an entitlement list in response to retrieving the entitlement data.

6. The fulfillment system of claim 1, wherein the secured activity is a request to access the application, and the granting of the access further comprises generating an entitlement list for the application.

7. The fulfillment system of claim 6, wherein the entitlement list, when processed by the application, causes the application to permit activities in accordance with the entitlement list.

8. The fulfillment system of claim 1, wherein the retrieving entitlement data and the generating of the entitlement file to respond to request are performed in response to an application programming interface (API) command.

9. The fulfillment system of claim 1, wherein the processor is further configured to perform at least the following:

monitoring system demand;

detecting high demand associated with a first type of service request;

determining a need to assign an employee to a role that services the first type of service request;

identifying a qualified employee based on at least the first type of service request; and associating the qualified employee with a first entitlement role, said association automatically providing the qualified employee with access to permitted secured activities in at least one application.

10. The fulfillment system of claim 9, wherein the associating is performed automatically in response to the detection of high demand.

11. The fulfillment system of claim 10, wherein the processor is further configured to detect high demand based on at least one of the following:

a rate of service requests received at the fulfillment system;

a number of pending service requests;

a number of employees servicing service requests;

customer feedback; and customer wait time.

12. The fulfillment system of claim 9, wherein the processor is further configured to cause the qualified employee to receive service requests of the first type of service request.

13. The fulfillment system of claim 9, wherein the secured activities are permitted for the first entitlement role.

14. The fulfillment system of claim 9, wherein the processor is further configured to detect high demand associated with the first type of service request received at a first channel.

15. The fulfillment system of claim 1, wherein the processor is further configured to store training data related to a plurality of employees and to monitor training programs for the plurality of employees.

16. The fulfillment system of claim 15, wherein the processor is further configured to perform at least the following:

detecting a completion of a training program by a first employee; and determining that the first employee has completed all training programs required to be eligible to be associated with a first entitlement role.

17. The fulfillment system of claim 16, wherein the processor is further configured to cause the automatic association of the first employee with the first entitlement role, the automatic association providing the first employee with authorization for the secured activities in at least one application.

18. The fulfillment system of claim 17, wherein the secured activities in the at least one application are associated with the first entitlement role.

19. A computer implemented method for providing employee access to secured resources at a customer request fulfillment system, the method comprising:

receiving a customer request through one or more network connected channels;

standardizing of an interaction with the customer with another interaction with at least one other customer received through the one or more network connected channels based on a standard library of rules to generate a standardized customer response to the customer and to the at least one other customer;

processing the customer request to determine a secured activity required to resolve the customer request;

detecting initialization of an application associated with the secured activity;

identifying an authenticated principal associated with the secured activity;

retrieving entitlement data associated with the authenticated principal and the application, the entitlement data including at least access control data for a plurality of secured activities supported in the application and at least one dynamically assigned role attribute;

generating an entitlement file by the processing the entitlement data; and transmitting the entitlement file to a processor;

wherein the processor is programmed to perform at least the following:

receiving the entitlement file;

determining that the authenticated principal is permitted to perform the secured activity in the application based on the entitlement data in the entitlement file; and permitting the authenticated principal to perform the secured activity in response to the determining.

20. The method of claim 19, wherein the authenticated principal is a user, an entitlement role, a computer, an entity, or an application.

21. The method of claim 20, wherein the entitlement role is associated with a plurality of users with at least one common attribute.

22. The method of claim 19, wherein the permitting of the authenticated principal to perform the requested secured activity includes determining that the authenticated principal is a first entitlement role that is permitted to perform the secured activity in the application, the method further comprising:

associating a first user with the first entitlement role.

23. The method of claim 19, further comprising generating an entitlement list in response to retrieving the entitlement data.

24. The method of claim 19, wherein the secured activity is a request to access the application, the method further comprising generating an entitlement list for the application.

25. The method of claim 19, wherein the entitlement list, when processed by the application, causes the application to permit activities in accordance with the entitlement list.

26. The method of claim 19, wherein the retrieving of the entitlement data and the generating of the entitlement file are in response to an application programming interface (API) command.

27. The method of claim 19, further comprising:
monitoring system demand;
detecting high demand associated with a first type of service request;
determining a need to assign an employee to a role that services the first type of service request;
identifying a qualified employee based on at least the first type of service request; and
associating the qualified employee with a first entitlement role, the associating automatically providing the qualified employee with access to permitted secured activities in at least one application.

28. The method of claim 27, wherein the associating is performed automatically in response to the detection of high system demand.

29. The method of claim 28, wherein the detection of high demand is based on at least one of the following:
a rate of service requests received at the fulfillment system;
a number of pending service requests;
a number of employees servicing service requests;
customer feedback; and
customer wait time.

30. The method of claim 27, further comprising causing the qualified employee to receive service requests of the first type of service request.

31. The method of claim 27, wherein the secured activities in the at least one application are permitted for the first entitlement role.

32. The method of claim 27, further comprising detecting high demand associated with the first type of service request received at a first channel.

33. The method of claim 19, further comprising:
storing training data related to a plurality of employees; and
monitoring training programs for the plurality of employees.

34. The method of claim 33, further comprising:
detecting a completion of a training program by a first employee; and
determining the first employee has completed all training programs required to be eligible to be associated with a first entitlement role.

35. The method of claim 34, further comprising:
automatically associating the first employee with the first entitlement role, the associating automatically providing the first employee with authorization for the secured activities in at least one application.

36. The fulfillment system of claim 35, wherein the secured activities in the at least one application are associated with the first entitlement role.

37. The fulfillment system of claim 1, wherein the standardized customer response comprises similar questions to the customer and to the at least one other customer across the one or more network connected channels.

38. The fulfillment system of claim 1, wherein the standardized customer response to the customer and to the at least one other customer consists of automated voice, text and graphics.

* * * * *